(12) United States Patent
Mellor et al.

(10) Patent No.: US 12,540,320 B2
(45) Date of Patent: *Feb. 3, 2026

(54) METHODS FOR NORMALIZING NUCLEIC ACID SAMPLES

(71) Applicant: seqWell, Inc., Beverly, MA (US)

(72) Inventors: Joseph C. Mellor, Melrose, MA (US); Jack T. Leonard, South Hamilton, MA (US)

(73) Assignee: seqWell, Inc., Beverly, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,417

(22) Filed: Nov. 17, 2022

(65) Prior Publication Data

US 2024/0167016 A1 May 23, 2024

Related U.S. Application Data

(63) Continuation of application No. 15/543,305, filed as application No. PCT/US2016/013753 on Jan. 16, 2016.

(Continued)

(51) Int. Cl.
*C12N 15/10* (2006.01)
*C12Q 1/6806* (2018.01)
(Continued)

(52) U.S. Cl.
CPC ....... *C12N 15/1065* (2013.01); *C12Q 1/6806* (2013.01); *C12Q 1/6874* (2013.01); *C40B 40/08* (2013.01)

(58) Field of Classification Search
CPC ............. C12N 15/1065; C12Q 1/6806; C12Q 1/6874; C40B 40/08
(Continued)

(56) References Cited

U.S. PATENT DOCUMENTS 5,210,015 A 5/1993 Gelfand et al.
5,635,400 A 6/1997 Brenner
(Continued)

FOREIGN PATENT DOCUMENTS

EP 0799897 A1 10/1997
EP 2527438 A1 11/2012
(Continued)

OTHER PUBLICATIONS

Becker-André et al., "Absolute mRNA quantification using the polymerase chain reaction (PCR). A novel approach by a PCR aided transcript titration assay (PATTY)," Nucleic Acids Res. 17(22):9437-46 (1989).
(Continued)

*Primary Examiner* — Heather Calamita
*Assistant Examiner* — Randi Lynn Beil
(74) *Attorney, Agent, or Firm* — Clark & Elbing LLP

(57) ABSTRACT

The present invention features, inter alia, compositions and methods for normalizing nucleic acid-containing samples. Fragments from each of the plurality of original samples are normalized in parallel. The compositions of the invention encompass the various constructs described herein, which may be variously packaged with one or more additional reagents useful in the present methods and instructions for use.

12 Claims, 9 Drawing Sheets

Specification includes a Sequence Listing.

Related U.S. Application Data

(60) Provisional application No. 62/104,107, filed on Jan. 16, 2015.

(51) Int. Cl.
*C12Q 1/6874* (2018.01)
*C40B 40/08* (2006.01)

(58) Field of Classification Search
USPC .......................................................... 506/23
See application file for complete search history.

(56) References Cited

U.S. PATENT DOCUMENTS

| | | | |
|---|---|---|---|
| 5,763,239 A | 6/1998 | Short et al. | |
| 5,925,517 A | 7/1999 | Tyagi et al. | |
| 5,981,179 A | 11/1999 | Lorinez et al. | |
| 6,174,670 B1 | 1/2001 | Wittwer et al. | |
| 6,569,627 B2 | 5/2003 | Wittwer et al. | |
| 8,420,319 B2 | 4/2013 | Mikawa | |
| 8,536,322 B2 | 9/2013 | Han | |
| 8,728,737 B2 | 5/2014 | Makarov et al. | |
| 9,005,935 B2 | 4/2015 | Belyaev | |
| 9,040,256 B2 | 5/2015 | Grunenwald et al. | |
| 9,080,211 B2 | 7/2015 | Grunenwald et al. | |
| 9,085,801 B2 | 7/2015 | Grunenwald et al. | |
| 9,115,396 B2 | 8/2015 | Grunenwald et al. | |
| 10,184,122 B2 | 1/2019 | Grunenwald et al. | |
| 2008/0318233 A1* | 12/2008 | Glenn .................. | C12Q 1/6809 435/6.1 |
| 2010/0120098 A1 | 5/2010 | Grunenwald et al. | |
| 2012/0071331 A1 | 3/2012 | Casbon et al. | |
| 2012/0220494 A1* | 8/2012 | Samuels ................ | C40B 50/08 506/26 |
| 2012/0316074 A1 | 12/2012 | Saxonov | |
| 2012/0322681 A1 | 12/2012 | Kung et al. | |
| 2013/0203605 A1 | 8/2013 | Shendure et al. | |
| 2014/0228255 A1* | 8/2014 | Hindson ............. | C12Q 1/6874 506/26 |
| 2015/0337298 A1 | 11/2015 | Xi et al. | |
| 2016/0168564 A1 | 6/2016 | Jacobson et al. | |
| 2017/0136458 A1 | 5/2017 | Dunne et al. | |
| 2018/0010120 A1* | 1/2018 | Mellor .................... | C40B 40/08 |
| 2018/0016571 A1 | 1/2018 | Gloeckner et al. | |
| 2018/0201925 A1 | 7/2018 | Steemers et al. | |

FOREIGN PATENT DOCUMENTS

| | | | | |
|---|---|---|---|---|
| WO | WO-2010/048605 A1 | 4/2010 | | |
| WO | WO-2014047561 A1 | 3/2014 | | |
| WO | WO-2014171898 A2 | 10/2014 | | |
| WO | WO-2016073690 A1 * | 5/2016 | ......... | C12N 15/1065 |
| WO | WO-2020131383 A1 * | 6/2020 | ......... | C12N 15/1065 |
| WO | WO-2021216574 A1 * | 10/2021 | | |

OTHER PUBLICATIONS

Bernard et al., "Color multiplexing hybridization probes using the apolipoprotein E locus as a model system for genotyping," Anal Biochem. 273(2):221-8 (1999).

Brenner et al., "In vitro cloning of complex mixtures of DNA on microbeads: physical separation of differentially expressed cDNAs," Proc Natl Acad Sci U S A. 97(4):1665-70 (2000).

Caruccio, "Preparation of Next-Generation Sequencing Libraries Using Nextera™ Technology: Simultaneous DNA Fragmentation and Adaptor Tagging by In Vitro Transposition," Methods Mol Biol. 733:241-55 (2011) (16 pages).

Diviacco et al., "A novel procedure for quantitative polymerase chain reaction by coamplification of competitive templates," Gene. 122(2):313-20 (1992) (Abstract Only).

Extended European Search Report for European Application No. 16738029.4, dated Sep. 25, 2018 (8 pages).

Freeman et al., "Quantitative RT-PCR: pitfalls and potential," Biotechniques. 26(1):112-122, 124-5 (1999) (12 pages).

International Search Report and Written Opinion for International Patent Application No. PCT/US2016/013753, mailed May 12, 2016 (7 pages).

Mackay et al., "Real-time PCR in virology," Nucleic Acids Res. 30(6): 1292-305 (2002).

Picelli et al., "Tn5 transposase and tagmentation procedures for massively scaled sequencing projects," Genome Res. 24(12):2033-40 (2014).

Shoemaker et al., "Quantitative phenotypic analysis of yeast deletion mutants using a highly parallel molecular bar-coding strategy," Nat Genet. 14(4):450-6 (1996).

Syed et al., "Next-generation sequencing library preparation: simultaneous fragmentation and tagging using in vitro transposition," Nature Methods. 6(11):i-ii (2009).

Zimmerman et al., "Technical aspects of quantitative competitive PCR," Biotechniques. 21(2):268-72, 274-9 (1996) (10 pages).

* cited by examiner

METHODS FOR NORMALIZING NUCLEIC ACID SAMPLES

TECHNICAL FIELD

The present invention relates to the technical field of DNA sample preparation. More specifically, the compositions and methods described herein are useful in normalizing nucleic acid samples.

SEQUENCE LISTING

The instant application contains a Sequence Listing which has been submitted electronically in XML format and is hereby incorporated by reference in its entirety. Said XML copy, created on Feb. 3, 2023, is named 51178-005003_Sequence_Listing_2_1_23 and is 9,886 bytes in size.

BACKGROUND

In many different research and clinical endeavors, it is desirable to obtain nucleic acid sequence information contained in multiple, distinct samples in parallel.

A ubiquitous implementation of individual-sample or single-plex DNA sequencing, commonly known as "Sanger sequencing", is carried out using DNA polymerase to incorporate fluorescent dideoxynucleotide terminators into a series of nested extension products in a DNA template-dependent manner, after which, the extension products are separated on a capillary electrophoresis instrument coupled to a fluorometer that outputs signal corresponding to the sequential nucleotide incorporation events. Sanger sequencing is currently considered the gold standard for individual DNA read quality; it is accurate and reliable, particularly when obtaining sequence results from a small number of DNA templates at a time (<100), and especially when the regions of interest are between about a few hundred and 750 base pairs long.

Large-scale multiplex sequencing, sometimes referred to as next generation sequencing (NGS), massively parallel sequencing (MPS), or second-generation sequencing, encompasses several technology platforms that allow thousands to millions of heterogeneous DNA molecules in one sample to be prepared and analyzed at the same time. As a result, many nucleotide sequences in a large mixture (commonly known as a "library") can be retrieved in a single analysis.

In addition to differing in the number of sequences that are acquired in a single analysis, single-plex (i.e., Sanger) and multiplex sequencing also differ in how they permit tracking of isolated samples from a collection. In single-plex sequencing, the origin or position of a particular ascertained sequence is generally unambiguous because a single, isolated sample of template DNA is the input for analysis and can be linked by direct tracking to the output sequence data. For example, one would record the position of a sample on a microtiter plate or the capillary into which the sample was loaded prior to electrophoresis. In multiplex/NGS sequencing, by using input barcoding, tagging, or an indexing scheme, the position or origin of a particular template DNA in a collection can be ascertained by incorporating an identifiable sequence tag (i.e., a distinct DNA sequence) into library fragments that are derived from a certain well or location. However, for sequencing many thousands of isolated or traceable samples, the conventional modes of input-indexing for molecular tagging of individual samples (sometimes called simply "barcoding") are often prohibitively expensive.

Sanger sequencing is still the default method for DNA sequencing in instances and particularly where one needs (1) long, high-quality (low error rate) sequences, (2) positional information on a plate or collection of the location of a sequenced template or DNA clone, and/or (3) overall practicality in terms of project cost, design, number of samples, or other material constraints associated with conventional NGS approaches. For example, Sanger sequencing remains the method of choice in, for example, screening-by-sequencing, performed in the context of clone identification during engineering of peptides, full-length sequencing of customized panels of long amplicons, or sequencing of full-length products produced via chemical gene synthesis.

NGS has supplanted Sanger sequencing where the raw amount of data obtained, typically measured in millions or billions of bases read out, is of high utility. For example, it is now possible to sequence all of the approximately six billion bases of the human genome at sufficient depth in a single day. Many other applications that require precise counting of large abundances of different nucleic acids (e.g., sequencing and quantify the mRNA expressed in a human cell), also benefit greatly from the large amount of raw sequence data that can now be cheaply and easily obtained.

Even as the capacity for modern sequencing instrumentation has grown, it remains relatively challenging to use the sequencing capacity of modern instruments to sequence larger numbers of distinct sample simultaneously. For example, by conventional estimates, the amount of sequencing capacity needed to sequence one diploid human genome (six billion nucleotides) is roughly on par with the capacity needed to sequence one thousand *E. coli* genomes (five million nucleotides). However, the materials and cost associated with conventionally preparing the nucleic acid sample libraries for next generation sequencing from one thousand *E. coli* samples would exceed that of a single human genomic sample by at least a factor of 100. This is an example of the so-called "library preparation bottleneck" that underlies the difficulty in sequencing large numbers of samples simultaneously.

Various methods are known for preparing libraries suitable for NGS from nucleic acid samples. Representative approaches include, for example, those described in U.S. Pat. Nos. 8,420,319; 8,728,737; and 9,040,256. A unifying feature of these approaches is that random fragments are generated from a nucleic acid sample (e.g., a genomic DNA sample), and a library is derived by adding asymmetric adapters, resulting in adapted fragments that can be amplified by various means (e.g., PCR). With these approaches, the amount or concentration of the nucleic acid sample must also generally be quantified to a prescribed level of precision in order for the efficiency, quality or yield of the library preparation method.

Multiplexing of libraries made by conventional approaches is typically accomplished by incorporating one or more identifiable sequence tags, or barcodes, into adapters that are attached to fragments in each derived library. Many such libraries can then be combined in desired proportions by measuring the amount or concentration of each of a plurality of libraries and mixing them together to make a unified library. In some cases, this approach can be automated by the use of robotics or other automation methods that are capable of measuring the concentration and adaptively pooling the individual libraries in a desired mix.

Other streamlined normalization strategies can be used to enhance the efficiency of parallelization of library preparation methods. For example, the input nucleic acid samples can be normalized before creating a library, or individual libraries can be normalized using a sample receptacle with limited reversible binding capacity (e.g., ThermoFisher SEQUALPREP® Normalizing Plates) or a nucleic acid binding composition that exhibits limited reversible binding capacity (see, e.g., U.S. Pat. No. 8,536,322). However, these approaches add a distinct step that consumes additional time and adds material cost to NGS library preparation. Also, samples are still processed in parallel rather than collectively, which means this disadvantage grows linearly with the number of samples.

What current methods known to the art therefore generally lack is the ability to create a multiplexed, normalized library suitable for NGS without the need for independent adjustment or parallelized normalization of input samples or resulting libraries.

It is thus an object of the present invention to provide methods that can create a unified library of linear, non-selectively amplified DNA molecules from a plurality of different samples, suitable for NGS, whilst maintaining normalized percentages of DNA molecules arising from each sample.

It is a further object of the present invention to provide methods that can be used to create a unified library of linear, non-selectively amplified DNA molecules from a plurality of different samples in parallelized and pooled fashion, without a need to explicitly normalize the amount of DNA present in each sample, nor measure, assess or explicitly normalize a multiplicity of different libraries to make a unified library.

It is a further object of the present invention to decrease the difficulty and time that would otherwise be associated with preparing a normalized, unified library of DNA molecules from a plurality of different samples, using any of the methods that are currently known or practiced in the art.

SUMMARY OF THE INVENTION

The present invention features, inter alia, compositions and methods for preparing, from a plurality of original, nucleic acid-containing samples, a unified library of linear, non-selectively amplified DNA fragments in which the proportional representation of the fragments from each of the plurality of original samples is normalized (i.e., the fragments are represented about equally) and the library is created in a highly parallelized, pool-based fashion. The invention is particularly useful for preparing libraries in which specific information is encoded that allows shorter sequencing reads derived from high-throughput sequencing of the library to be analyzed or assembled into longer scale sequences that are fully traceable to an original, nucleic acid-containing sample within a potentially very large collection of samples. The compositions of the invention encompass the various constructs described herein, which may be variously packaged with one or more additional reagents useful in the present methods and instructions for use.

Generally, in the present methods, each sample within a plurality of nucleic acid samples is first subjected to a sample tagging step in which a plurality of nucleic acid molecules in each sample is modified to incorporate an identifiable sequence tag. Each sample to be analyzed is treated (e.g., contacted by, under the conditions described herein or conventional reaction conditions known to molecular biologists) with a construct that includes a unique, identifiable sequence tag such that one sample can be distinguished from another based on that tag. In preferred embodiments, the sample tagging step is performed under reaction conditions that limit the number of incorporated tags to a number that is far less than the number of available sites of modification present in each sample (e.g., less than one incorporated tag per about 1000 nucleotide bases present in the nucleic acid molecules of the sample (e.g., less than about 1,000, 900, 800, 700, 600, or 500 nucleotide bases)) and, preferably, is held the same for all samples in the plurality.

According to the present methods, the sample tagging step can be carried out such that the number of incorporated, identifiable sequence tags in each sample will be approximately equal for all treated samples in a plurality, regardless of the amount or concentration of nucleic acid present in each sample. This can be achieved in at least some embodiments using the prescribed reaction conditions described herein and, more generally, where the reagent or construct used to incorporate the identifiable sequence tag is kept limited relative to a range of possible sample nucleic acid concentrations.

Following the sample tagging step, the plurality of identifiably tagged samples is then pooled and further treated in a pool tagging step in which a plurality of sample-tagged nucleic molecules in the pool are modified to incorporate an additional identifiable sequence tag that identifies the pool (referred to on occasion herein as a "pool tag").

In preferred embodiments, the reaction conditions under which the pool tagging step is performed is such that a pool tag is added, on average, within a range of X nucleotides from any sample tag present on the nucleic acid molecules within the pool. In various embodiments, X can be selected to a prescribed value, for example about 100, 500, or 1000 nucleotides. A non-obvious feature of the pool-tagging step, when performed as prescribed in certain preferred embodiments, is that the incorporation of pool tags is independent of the location of any sample tag present on any nucleic acid molecule present in the pool, and also independent of the relative concentration of nucleic acid molecules arising from any particular sample or samples previously subjected to sample-tagging. It can thus be said that the instances of pool tags occurring within X nucleotides of any sample tag present in the pool is normalized.

Following the pool-tagging step, the nucleic acid molecules present in the pool can, in further embodiments, be amplified. Amplification can be aided by, for example, PCR, with primers that hybridize to regions or subregions of the sequences that are alternately common to all sample tags, all pool tags, or both. In this manner, a unified, normalized library of linear, non-selectively amplified DNA fragments from arising from plurality of original nucleic acid-containing samples is obtained.

Accordingly, in a first aspect, the invention features a method of obtaining an iteratively tagged library of DNA fragments from a plurality of samples. The method can include the steps of: (a) contacting target nucleic acid molecules in first and second samples of the plurality with, respectively, uniform and limiting amounts of first and second constructs each comprising an identifiable sample sequence tag, wherein the sample sequence tag in the first construct differs from the sample sequence tag in the second construct and the contacting occurs for a duration and under conditions in which the sample sequence tag in the first construct is integrated into the nucleic acid molecules in the first sample and the sample sequence tag in the second construct is integrated into the nucleic acid molecules in the second sample; (b) pooling the first and second samples to yield a pool of sample-tagged nucleic acid molecules; (c) contacting the pool of sample-tagged nucleic acid molecules with a third construct comprising a pool tag, wherein the contacting occurs for a duration and under conditions in which the pool tag is integrated into the nucleic acid molecules of the pool at a prescribed frequency per nucleotide, thereby generating a pool of sample-tagged, pool-tagged nucleic acid molecules; and (d) amplifying the sample-tagged, pool-tagged nucleic acid molecules with oligonucleotides comprising (i) a nucleic acid sequence complementary to a nucleic acid sequence in the sample-tagged, pool-tagged nucleic acid molecules and (ii) a nucleic acid sequence suitable for next generation sequencing, thereby generating amplified nucleic acid molecules. When carried out as described here and elsewhere in our description of the invention, such methods produce DNA libraries in which the relative abundances of DNA fragments in each library corresponding to a sample are normalized. In various embodiments, the pool tag includes an identifiable sequence tag that can be integrated into the pooled, sample-tagged nucleic acid molecules at a prescribed frequency per nucleotide (e.g., a frequency that yields a pool tag between about 100-20,000 nucleotides (e.g., 100-10,000 or 100-1,000), on average, away from each sample sequence tag on the sample-tagged nucleic acid molecules in the pool.

At least one sample in the plurality of samples can be, or can include, genomic DNA. Further, at least one sample in the plurality of samples can be, or can include, cDNA, synthetic DNA, or DNA found naturally in a virus, bacterium, yeast, fungus, protozoan, insect, fish, avian, mammal, or plant. Various types of DNA, or DNA from various sources, may be present in any given sample. As noted, a plurality of samples (e.g., 2 to about 9,600 samples) can be processed in parallel (e.g., about 100 96-well plates, containing a sample in each well, can be processed in parallel).

In the present methods, the first and second constructs can include an adapter that is subsequently ligated to the target nucleic acid molecules or a transposase or a biologically active variant thereof that subsequently introduces the identifiable sample sequence tag into the target nucleic acid molecules. Useful transposases may be hyperactive and exhibit little or no sequence bias. For example, constructs useful in the present methods can include Tn3, Tn5, Tn9, Tn10, gamma-delta, or Mu transposase, combinations thereof, or biologically active variants thereof.

In the conditions in which the sample sequence tag is integrated into the target nucleic acid molecules, the amount(s) of the sample sequence tag(s) can be at least two-fold lower than the amount(s) of the pool tag(s) subsequently used to contact the pool of sample-tagged nucleic acid molecules.

Turning to the third construct, this construct can also include an adapter that is subsequently ligated (e.g., ligated to the sample-tagged nucleic acid molecules) or a transposase (including any of those listed above), or a biologically active variant thereof, that subsequently introduces the pool tag into the sample-tagged nucleic acid molecules. Any of the first, second, or third constructs, independently, can also include a moiety that specifically binds a capture agent (e.g., a nucleic acid sequence that specifically binds a protein or nucleic acid sequence within the capture agent). For example, the moiety that specifically binds the capture agent can be a moiety that has been biotinylated or digoxigenylated.

In the methods of the invention, one can normalizing a population of sample-tagged and/or pool-tagged nucleic acid molecules by exposing the population to a limited amount of the capture agent.

The steps described above can be followed by subjecting the iteratively tagged library of DNA fragments to next generation sequencing.

In another aspect, the invention features a kit comprising: (a) a plurality of constructs (e.g., two to about 9,600 constructs) that include identifiable sample sequence tags, wherein the identifiable sample sequence tag in a first construct of the plurality is distinct from the identifiable sample sequence tag in the second construct; and (b) instructions for use. The instructions can be in any form, including a written/printed form, provided by an audio or video recording stored on any suitable medium, or provided through a link to a website-based tutorial. The kit can further include a pool-tagging reagent (e.g., a construct as described herein) for adding an identifiable sequence tag to one or more nucleic acids in a pool of sample-tagged nucleic acids and/or a reagent for amplifying a sample-tagged and/or pool-tagged nucleic acid molecule.

BRIEF DESCRIPTION OF THE DRAWINGS

The drawings briefly described here are intended to help illustrate the invention and are not limiting.

DETAILED DESCRIPTION

Figure 1:
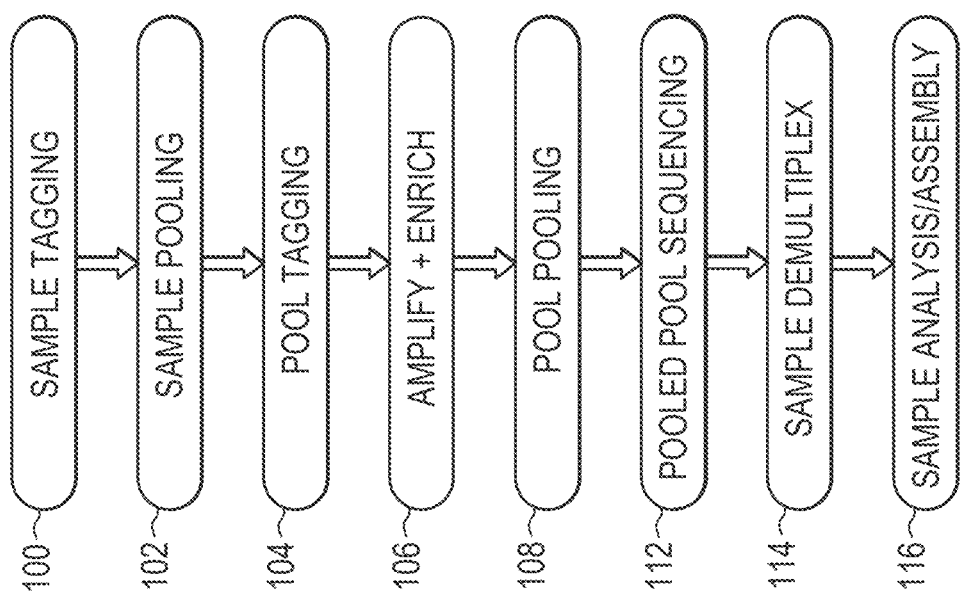
FIG. 1 is a schematic illustration of a representative embodiment of a protocol and steps that can be used to implement the present invention. The method illustrated begins with sample tagging and ends with sequencing analysis.

The following description is presented to enable a person of ordinary skill in the art to make and use various aspects and examples of the present invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

In one aspect, the present invention comprises methods for preparing a unified library of linear, non-selectively amplified DNA fragments from a plurality of original nucleic acid containing samples, wherein the proportional representation of linear fragments from each of the plurality of original samples is normalized. These methods are particularly useful for preparing DNA sequencing libraries in which specific information is encoded that allows sequencing reads derived by high-throughput short read sequencing of the library to be analyzed or assembled into longer scale sequences that are fully traceable to an original isolated sample within a potentially large collection of samples.

In another aspect, the present invention comprises one or more kits that provide reagents and instructions for accomplishing the disclosed methods of the invention.

The teaching of the present invention makes use of terms whose meanings are to be construed in the following manner unless the context in which the term is used clearly indicates otherwise.

The term "about" is used herein to indicate that a value includes an inherent variation of error for the device or the method being employed to determine the value or to indicate plus-or-minus 10% of the stated/reference value, whichever is greater.

We use the term "biologically active variant" to refer to a moiety that is similar to, but not identical to, a referenced moiety (e.g., a "parent" molecule or template) and that exhibits sufficient activity to be useful in one or more of the methods described herein (e.g., in place of the referenced moiety). In some instances, the referenced moiety is naturally occurring and the biologically active variant thereof is not. For example, where the referenced moiety is a naturally occurring nucleic acid sequence, a biologically active variant thereof can include a limited number of non-naturally occurring nucleotides; can have a nucleic acid sequence that differs from its naturally occurring counterpart; or can otherwise vary from its naturally occurring counterpart. For example, the tagmentation reagents can include a "transposase binding site" (TBS) that differs from a naturally occurring TBSs, but nevertheless retains the ability to bind a transposase well enough to function in the present compositions and methods. Where the referenced moiety is a naturally occurring protein, a biologically active variant thereof can include a limited number of non-naturally occurring amino acids; can have a peptide sequence that differs from its naturally occurring counterpart; or can otherwise vary from its naturally occurring counterpart (e.g., by virtue of being modified differently post-translationally (e.g., its glycosylation pattern may differ).

The term "demultiplex" means to analyze by any of several means, the identifiable sequence tag information present on any sequenced library fragment or fragments, and use of that information to assign the origin of said fragment or fragments to a particular original sample that was modified to incorporate said identifiable sequence tag.

In some embodiments, said adapter carries a subsequence of degenerate random, semi-random or non-random "identifiable sequence tags". In various embodiments, the identifiable sequence tags may be identical or non-identical between different synaptic complexes. In some embodiments, the identifiable sequence tags can be used to "demultiplex" (i.e., to computationally group or separate) sequencing reads that originated from individual samples (i.e., sample-tagged reads) and/or from certain pools (i.e., pool-tagged reads).

"Kit" refers to any delivery system for delivering materials or reagents for carrying out a method of the invention. In the context of assays, such delivery systems include systems that allow for the storage, transport, or delivery of reaction reagents (e.g., probes, enzymes, etc. in the appropriate containers) and/or supporting materials (e.g., buffers, written instructions for performing the assay etc.) from one location to another. For example, kits include one or more enclosures (e.g., boxes) containing the relevant reaction reagents and/or supporting materials for assays of the invention. Such contents may be delivered to the intended recipient together or separately. For example, a first container may contain an enzyme for use in an assay, while a second container contains one or more probes.

A "library" or "fragment library" is a collection of nucleic acid molecules derived from one or more nucleic acid samples, in which fragments of nucleic acid have been modified, generally by incorporating terminal adapter sequences comprising one or more primer binding sites and identifiable sequence tags.

In the context of the present invention and particularly with regard to, normalization, the terms "limiting", "limited amount(s)," and the like are used to describe the amount of a construct, such as a construct comprising an active transposase, that will not generate more than the desired number of "tagging instances" (i.e., transposition events) over a wide range of target DNA concentrations. The distance between the sites implicitly controls the size of the sequenceable fragments that are created. For example, if the average distance between sites is 500, then the fragment size will be on average 500.

The terms "multiplex" or "multiplexed" when used herein generally refers to an assemblage into one pool, tube or reaction of a plurality of nucleic acid samples, or library molecules derived thereof.

The term "normalization" refers to a method whereby variability in DNA sequencing reads between DNA samples is substantially reduced. Although normalization is typically achieved by laboriously measuring and adjusting the concentration of each DNA sample at various stages of library preparation by sample dilution, normalization in the embodiments described herein is achieved by tagging and pooling techniques. Similarly, the term "normalized", when used herein, refers to a generally desirable attribute of a heterogenous mix of nucleic acid molecules or fragments whereby the variability in the abundance of fragments arising from different original sources has been substantially reduced relative to the abundance or amounts in the original sources. When used in the context of a derived or multiplex library (e.g. "normalized library") the term refers to attribute whereby the variation in proportional amounts (or percent representation) of nucleic acid fragments in the library from each of a plurality of samples is lower than the variation in the amounts of original samples. Although normalization is typically achieved by laboriously measuring and adjusting the concentration of each DNA sample at various stages of library preparation by sample dilution, normalization in the embodiments described herein is achieved by tagging and pooling techniques.

"Oligonucleotide" or "polynucleotide," which are generally used synonymously, means a linear polymer of natural or modified nucleosidic monomers linked by phosphodiester bonds or analogs thereof. The term "oligonucleotide" usually refers to a shorter polymer, e.g., comprising from about 3 to about 100 monomers, and the term "polynucleotide" usually refers to longer polymers, e.g., comprising from about 100 monomers to many thousands of monomers, e.g., 10,000 monomers, or more. Oligonucleotides comprising probes or primers usually have lengths in the range of from 12 to 60 nucleotides, and more usually, from 18 to 40 nucleotides. Oligonucleotides and polynucleotides may be natural or synthetic. Oligonucleotides and polynucleotides include deoxyribonucleosides, ribonucleosides, and non-natural analogs thereof, such as anomeric forms thereof, peptide nucleic acids (PNAs), and the like, provided that they are capable of specifically binding to a target genome by way of a regular pattern of monomer-to-monomer interactions, such as Watson-Crick type of base pairing, base stacking, Hoogsteen or reverse Hoogsteen types of base pairing, or the like.

Usually nucleosidic monomers are linked by phosphodiester bonds. Whenever an oligonucleotide is represented by a sequence of letters, such as "ATGC . . . " it will be understood that the nucleotides are in 5' to 3' order from left to right and that "A" denotes deoxyadenosine, "C" denotes deoxycytidine, "G" denotes deoxyguanosine, "T" denotes deoxythymidine, and "U" denotes the ribonucleoside, uridine, unless otherwise noted. Usually oligonucleotides comprise the four natural deoxynucleotides; however, they may also comprise ribonucleosides or non-natural nucleotide analogs. It is clear to those skilled in the art when oligonucleotides having natural or non-natural nucleotides may be employed in methods and processes described herein. For example, where processing by an enzyme is called for, usually oligonucleotides consisting solely of natural nucleotides are required. Likewise, where an enzyme has specific oligonucleotide or polynucleotide substrate requirements for activity, e.g., single stranded DNA, RNA/DNA duplex, or the like, then selection of appropriate composition for the oligonucleotide or polynucleotide substrates is well within the knowledge of one of ordinary skill, especially with guidance from treatises, such as Sambrook et al., *Molecular Cloning*, Second Edition (Cold Spring Harbor Laboratory, New York, 1989), and like references. Oligonucleotides and polynucleotides may be single stranded or double stranded.

Oligonucleotides and polynucleotides may optionally include one or more non-standard nucleotide(s), nucleotide analog(s) and/or modified nucleotides. Examples of modified nucleotides include, but are not limited to diaminopurine, $S^2T$, 5-fluorouracil, 5-bromouracil, 5-chlorouracil, 5-iodouracil, hypoxanthine, xantine, 4-acetylcytosine, 5-(carboxyhydroxylmethyl)uracil, 5-carboxymethylaminomethyl-2-thiouridine, 5-carboxymethylaminomethyluracil, dihydrouracil, beta-D-galactosylqueosine, inosine, N6-isopentenyladenine, 1-methylguanine, 1-methylinosine, 2,2-dimethylguanine, 2-methyladenine, 2-methylguanine, 3-methylcytosine, 5-methylcytosine, N6-adenine, 7-methylguanine, 5-methylaminomethyluracil, 5-methoxyaminomethyl-2-thiouracil, beta-D-mannosylqueosine, 5'-methoxycarboxymethyluracil, 5-methoxyuracil, 2-methylthio-D46-isopentenyladenine, uracil-5-oxyacetic acid (v), wybutoxosine, pseudouracil, queosine, 2-thiocytosine, 5-methyl-2-thiouracil, 2-thiouracil, 4-thiouracil, 5-methyluracil, uracil-5-oxyacetic acid methylester, uracil-5-oxyacetic acid (v), 5-methyl-2-thiouracil, 3-(3-amino-3-N-2-carboxypropyl) uracil, (acp3)w, 2,6-diaminopurine and the like. Nucleic acid molecules may also be modified at the base moiety (e.g., at one or more atoms that typically are available to form a hydrogen bond with a complementary nucleotide and/or at one or more atoms that are not typically capable of forming a hydrogen bond with a complementary nucleotide), sugar moiety or phosphate backbone.

"Oligonucleotide tag", "sequence tag" or "tag" means an oligonucleotide or composite thereof that is attached to a polynucleotide and is used to identify and/or track the polynucleotide in a reaction. Usually, an oligonucleotide tag is attached to the 3'- or 5'-end of a polynucleotide to form a linear conjugate, sometime referred to herein as a "tagged polynucleotide," or equivalently, an "oligonucleotide tag-polynucleotide conjugate," or "tag-polynucleotide conjugate." Oligonucleotide tags may vary widely in size and compositions; the following references provide guidance for selecting sets of oligonucleotide tags appropriate for particular embodiments: Brenner, U.S. Pat. No. 5,635,400; Brenner et al., *Proc. Natl. Acad. Sci.*, 97:1665; Shoemaker et al., *Nature Genetics*, 14:450, 1996; Morris et al., EP Patent Pub. 0799897A1; Wallace, U.S. Pat. No. 5,981,179; and the like.

"PCR" (polymerase chain reaction) refers to a reaction for the in vitro amplification of specific DNA sequences by the simultaneous primer extension of complementary strands of DNA. In other words, PCR is a reaction for making multiple copies or replicates of a target nucleic acid flanked by primer binding sites, such reaction comprising one or more repetitions of the following steps: (i) denaturing the target nucleic acid, (ii) annealing primers to the primer binding sites, and (iii) extending the primers by a nucleic acid polymerase in the presence of nucleoside triphosphates. Usually, the reaction is cycled through different temperatures optimized for each step in a thermal cycler instrument. Particular temperatures, durations at each step, and rates of change between steps depend on many factors well-known to those of ordinary skill in the art, e.g., exemplified by the references: McPherson et al., editors, *PCR: A Practical Approach and PCR2: A Practical Approach* (IRL Press, Oxford, 1991 and 1995, respectively). For example, in a conventional PCR using Taq DNA polymerase, a double stranded target nucleic acid may be denatured at a temperature greater than 90° C., primers annealed at a temperature in the range 50-75° C., and primers extended at a temperature in the range 72-78° C.

PCR encompasses derivative forms of the reaction, including but not limited to, RT-PCR, real-time PCR, nested PCR, quantitative PCR, multiplexed PCR, and the like. Reaction volumes range from a few hundred nanoliters, e.g., 200 nL, to a few hundred microliters, e.g., 200 microliters. "Reverse transcription PCR," or "RT-PCR," means a PCR that is preceded by a reverse transcription reaction that converts a target RNA to a complementary single stranded DNA, which is then amplified, e.g., Tecott et al., U.S. Pat. No. 5,168,038. "Real-time PCR" means a PCR for which the amount of reaction product, i.e., amplicon, is monitored as the reaction proceeds. There are many forms of real-time PCR that differ mainly in the detection chemistries used for monitoring the reaction product, e.g., Gelfand et al., U.S. Pat. No. 5,210,015 ("Taqman"); Wittwer et al., U.S. Pat.

Nos. 6,174,670 and 6,569,627 (intercalating dyes); Tyagi et al., U.S. Pat. No. 5,925,517 (molecular beacons). Detection chemistries for real-time PCR are reviewed in Mackay et al., *Nucleic Acids Research*, 30:1292-1305 (2002). "Nested PCR" means a two-stage PCR wherein the amplicon of a first PCR becomes the sample for a second PCR using a new set of primers, at least one of which binds to an interior location of the first amplicon. As used herein, "initial primers" in reference to a nested amplification reaction mean the primers used to generate a first amplicon, and "secondary primers" mean the one or more primers used to generate a second, or nested, amplicon. "Multiplexed PCR" means a PCR wherein multiple target sequences (or a single target sequence and one or more reference sequences) are simultaneously carried out in the same reaction mixture (see, e.g., Bernard et al., *Anal. Biochem.*, 273:221-228, 1999 (two-color real-time PCR)). Usually, distinct sets of primers are employed for each sequence being amplified. "Quantitative PCR" means a PCR designed to measure the abundance of one or more specific target sequences in a sample or specimen. Quantitative PCR includes both absolute quantitation and relative quantitation of such target sequences. Techniques for quantitative PCR are well-known to those of ordinary skill in the art, as exemplified in the following references: Freeman et al. (*Biotechniques*, 26:112-126, 1999; Becker-Andre et al. (*Nucleic Acids Research*, 17:9437-9447, 1989; Zimmerman et al. (*Biotechniques*, 21:268-279, 1996; Diviacco et al. (*Gene*, 122:3013-3020, 1992; Becker-Andre et al., (*Nucleic Acids Research*, 17:9437-9446, 1989); and the like.

The terms "pool-tagged" or "collection-tagged" refer to a plurality of nucleic acid molecules that results from incorporating an identifiable sequence tag into a pool of sample-tagged nucleic acids, by any of various methods. In some embodiments, however, said "pool tag" carries no identifiable sequence tag, and serves instead as a minimal sequence adapter for adding nucleic acids onto sample-tagged nucleic acids, rendering the pool compatible with a particular DNA sequencing platform or amplification strategy.

"Primer" includes an oligonucleotide, either natural or synthetic, that is capable, upon forming a duplex with a polynucleotide template, of acting as a point of initiation of nucleic acid synthesis and being extended from its 3' end along the template so that an extended duplex is formed. The sequence of nucleotides added during the extension process are determined by the sequence of the template polynucleotide. Usually primers are extended by a DNA polymerase. Primers usually have a length in the range of between 3 to 36 nucleotides, from 5 to 24 nucleotides, or from 14 to 36 nucleotides. In certain aspects, primers are universal primers or non-universal primers. Pairs of primers can flank a sequence of interest or a set of sequences of interest. Primers and probes can be degenerate in sequence. In certain aspects, primers bind adjacent to the target sequence, whether it is the sequence to be captured for analysis, or a tag that it to be copied.

The term "sample-tagging" and "sample-tagged" refers to the process and result of incorporating an identifiable sequence tag into nucleic acid molecules comprising a nucleic acid sample.

The term "shotgun fragmentation" describes a wide range of methods that use mechanical DNA fragmentation methods (e.g., acoustics, nebulization, or sonication), or enzymatic DNA fragmentation by FRAGMENTASE® or other non-specific endonucleases. DNA breakpoints are typically randomly or semi-randomly distributed across the target DNA molecules present in a given sample. Other than fragments generated via tagmentation (described separately), the DNA fragments generated by most shotgun fragmentation methods require end repair and additional enzymatic modifications before adapters are ligated to the fragment termini in a multistep process often called "shotgun adaptation".

We use the terms "tagment" and "tagmentation" to describe methods in which purified transposases are used as reagents in artificial transposition reactions to prepare libraries for next generation DNA sequencing (NGS). In tagmentation, a transposase is first loaded with synthetic oligonucleotides carrying TBSs, then the loaded transposase will be active to cut target DNA and simultaneously ligate the loaded oligonucleotide "tags" and TBSs to the newly generated termini on the target DNA.

Referring now to the methods encompassed by the present invention in more detail, in FIG. 1 we illustrate steps that can be carried out in practicing an embodiment of the invention (see also FIGS. 2-6).

In FIG. 1, we show a sample tagging step 100 in which a nucleic acid sample of a plurality of samples is modified to incorporate, by any of several methods known in the art, an identifiable sequence tag, which we may also refer to as a DNA barcode, into DNA fragments produced by "shotgun" fragmentation and adaptation. The shotgun fragmentation and adaptation can be carried outachieved, for example, by random shearing, end repair and adapter ligation, by transposase adaptation (i.e., tagmentation), or by any similar method known in the art or later developed in the art.

A key feature of the sample tagging step is that the number of available tags that are added to each nucleic acid sample is kept fixed and relatively low compared to the available mass of nucleic acid in each sample. This limiting condition is alternately accomplished, for example, by modifying the reaction conditions of time, concentration, or other parameters known in the art, to influence fragmentation obtained by physical shearing, nuclease digestion, or transposase-based adaptation, in order to generate fragments that are over a prescribed length. In the case of the present invention, the prescribed or desired length may also be expressed as the number of tags added per nucleotide of all nucleotides present in a sample. As such, the number of tags added may be kept limited to less than one per unit mass or molarity of 1000 nucleotides, or other prescribed level. For example, in other embodiments, the number of tags added may be kept lower than one per unit mass or molarity of 2000, 3000, 4000, 5000 or more nucleotides.

As will be clear by various exemplary embodiments, the limiting condition imposed by keeping the rate of sample tagging in a sample below a prescribed per-nucleotide level may, in some cases, dictate that not all nucleic acid molecules present in a sample will necessarily receive a sample tag instance. Of particular importance and relevance to claimed invention herein, if multiple samples are tagged under similar conditions, and the amount of nucleic acid in each sample is allowed to vary, but the number of tagging instances is limited to less than a prescribed level, then the number of tagging instances will still be approximately equal between samples.

Still referring to FIG. 1, in the case where a plurality of template samples are subjected to the tagging step 100, it will be recognized as advantageous to incorporate a different or unique polynucleotide tag sequence into each individual sample within a plurality. Template samples so modified as shown in step 100 are subsequently referred to as having been 'sample-tagged', or as having a 'sample tag'. It will be additionally recognized as advantageous that the sample tag indicates a specific location of a sample in a collection of samples, such as the microwell position on a microtiter plate. Furthermore, it can be advantageous to include a distinct sequence-randomized sub-region within a sample tag, 4-20 bases in length, to count or detect DNA sequences derived from the same parent molecule later during DNA sequence analysis.

Still referring to FIG. 1, there is next shown a step 102 in which a plurality of samples that have been sample tagged in step 100 are pooled together into one mixture that subsequently contains a plurality of uniquely-tagged template samples that each contain one of a plurality of known tag sequences in addition to a variable length of otherwise unknown or partially unknown sequence that flanks, is proximal to, or is upstream or downstream of the known tag sequence.

Still referring to FIG. 1, there is next shown a step 104 in which the pooled tagged samples from step 102 are subjected to a pool tagging step such that the original nucleic acid molecules comprising the pooled sample are randomly or semi-randomly fragmented, cleaved or otherwise broken into smaller pieces by any of several methods known to practitioners of the art, and either subsequently or simultaneously adapted with known single-stranded or double-stranded DNA adapter sequences that flank the newly derived fragments on one or both ends. Concomitant fragmentation methods that could be used for step 102 could include, for example, enzymatic fragmentation by various enzymes such as a DNA exonuclease in combination with or without a DNA nickase, or shearing by mechanical forces such as nebulization (e.g. Hydroshear®) or sonication (e.g. Covaris®), or, preferably, tagmentation by a modified transposase that permits simultaneous fragmentation as well as ligation of a known oligonucleotide adapter to the fragmentation substrate. In cases where the fragmentation by enzymatic or mechanical means results in irregular nucleic acid ends, which is to say a mixture of different 3' or 5' overhangs or irregularly exposed hydroxyl groups, it is advantageous to "polish" or 3'-adenylate the DNA with enzymes that permit the subsequent ligation of adapters to the fragmented template sample. In such cases, the fragmented, polished and 3'-adenylated DNA can be subsequently treated via ligation or other suitable method to contain a flanking DNA adapter on one or both ends of a plurality of the newly derived fragments. The result of step 104 is a fragmented library of nucleic acid molecules that derive from the pool of tagged samples in step 102 in which there are a plurality of fragments that contain known adapter sequence on one or both ends.

A key feature accomplished by the pool-tagging of samples that have previously been sample-tagged by the methods of the invention is that the addition of pool tags depends only on the available mass of nucleic acid molecules present in the pool, and not on the relative amounts of individual sample molecules that were combined to make that pool, or the resulting frequencies of the individual nucleic acid molecules representing each sample in said same pool. Thus, when the pool tagging is performed, there is an equal probability of a pool tag being added, using any of the embodied methods of the invention, to a site of that is within a prescribed number of nucleotides of any sample tag representing any original sample that is already present in molecules that comprise the pool. When applied using the embodied methods of the invention, the resulting characteristic of the nucleic acid molecules that comprise the pool is that for every sample tag present on any nucleic acid molecule in the pool, there is an equal probability that one of the pool tags added by the pool tagging step will be present within a prescribed distance of the sample tag.

In various embodied methods of the invention, the spacing of sample and pool tags in a pool-tagged sample can be can be controlled or limited by modifying the conditions under which the pool tag is added. For example, the distance between sample tags and pool tags be altered by changing the reaction conditions of time, concentration, or other parameters known in the art, to influence fragmentation obtained by physical shearing, nuclease digestion, or transposase-based adaptation. It will be recognized as generally advantageous that under some preferred embodied conditions, the distance and relative orientation of each of a large plurality of sample tags and corresponding nearby pool tags that are situated on a same nucleic acid molecule will be such that allows for the amplification by PCR or other similar means, of a sequence subregion of said same nucleic acid molecule that is posed between the sample tag and pool tag.

Referring to step 106 of FIG. 1, the fragmented and pool-tagging of step 104 is amplified and enriched by suitable methods. A suitable method could include, for example, polymerase chain reaction (PCR). One of ordinary skill in the art will recognize that amplification using oligonucleotide primers that are specific for sequences incorporated in the original sample-tagging step 100 as well as for the pool-tagging step 104 can facilitate amplification and enrichment for library fragments that contain, at one end, the polynucleotide tag sequence that is used to identify the samples of step 100 in addition to a random fragment of an original template molecule flanked at the opposite end by the adapter added in step 104.

In additional embodiments, it will be recognized as particularly advantageous in cases where a plurality of different pools have been created from each of an original plurality of samples, each of which is a pooled, fragmented, adapted, amplified and enriched library resulting from the described steps 100, 102, 104 and 106, that the oligonucleotide primers used in the amplification and enrichment of step 106 can be modified to incorporate one or more uniquely identifying polynucleotide tag sequences (i.e., DNA barcodes or identifiable sequence tags) that can be further associated with the entire pool of adapted fragments resulting from step 106. In cases where the oligonucleotide primers are so modified, the resulting pool informed by the use of said pool-tag sequence can be used to uniquely identify the pool of origin for any sample fragment in the pool.

In additional embodiments, it will be recognized as particularly advantageous in cases where a plurality of different pools have been created from a plurality of pluralities of samples, that the pool tag sequence used as part of any pool tag step to incorporate one or more uniquely identifying pool-tag sequences (i.e., DNA barcodes or identifiable sequence tags) that can be further associated with the entire pool of adapted nucleic acid molecules present.

Still referring to FIG. 1, there is next shown a step 108 in which the amplified and enriched library pools, each labeled with a identifiable pool tag, are pooled to create a pool of tagged pools, i.e., a pooled pool.

Still referring to FIG. 1, there is next shown a step 112, in which a unified library as resulting step 10, having been additionally size-fractionated as required for further processing, is subjected to massively parallel sequencing (MPS), such as Illumina® HiSeq or MiSeq sequencing, or Ion Torrent® Proton sequencing. In some modes, the particular design or choice of adapters and oligonucleotide sequences used in steps 100 to 106 will influence the preferred choice of sequencing platform. In a preferred mode, the short read sequencing will be accomplished so as to determine the nucleotide sequence of a large plurality of different fragments from the library derived in step 110. Furthermore, also in a preferred mode, the short read sequencing is executed in such a way that the sequence determination of each fragment within a large plurality results in determining the sequences of any or all polynucleotide tag sequences in each fragment that result from step 100 or step 106, as well as the sequence of an known or unknown region of the original template from which the fragment derived.

Still referring to FIG. 1, there is next shown a step 114 in which the individual sequencing reads obtained in step 112 are categorized or demultiplexed according to the combination of polynucleotide tag sequences that originate from the sample tagging step 100 or the pool tagging at the pool amplification and enrichment step 106. In some embodiments, the exact combination of polynucleotide tag sequences can be used to map or associate a plurality of individual sequencing reads that have the same tags to the position of a sample in an original sample collection by virtue of the tag introduced at step 100, or to the pool of fragments representing an entire collection, by virtue of the tag introduced at step 106. In this manner, for each of a plurality of original samples represented in each of a plurality of original collections, a plurality of individual sequencing reads can be derived that uniquely map or correspond to one original sample. Furthermore, each of the individual sequencing reads in the immediately aforementioned plurality of reads contains the additional sequence determination of a possibly unknown region of the original nucleic acid template sample input to step 100.

Still referring to FIG. 1, there is next shown a step 116 in which the plurality of sequencing reads resulting from step 114, that are associated with one particular template nucleic acid sample in one original collection of template samples, is assembled, analyzed or computationally processed to derive an assembled sequence that corresponds to a region or regions in the original template nucleic acid. The process of assembly can be accomplished computationally by various existing DNA sequence assembly tools such as Velvet, MIRA, SSAKE or ALLPATHS. If de novo assembly of derived reads is not desired, the derived reads can also be compared and/or mapped to a nucleotide sequence reference using various existing DNA sequence alignment tools such as BWA, BOWTIE, MAQ, etc.

Figure 2:
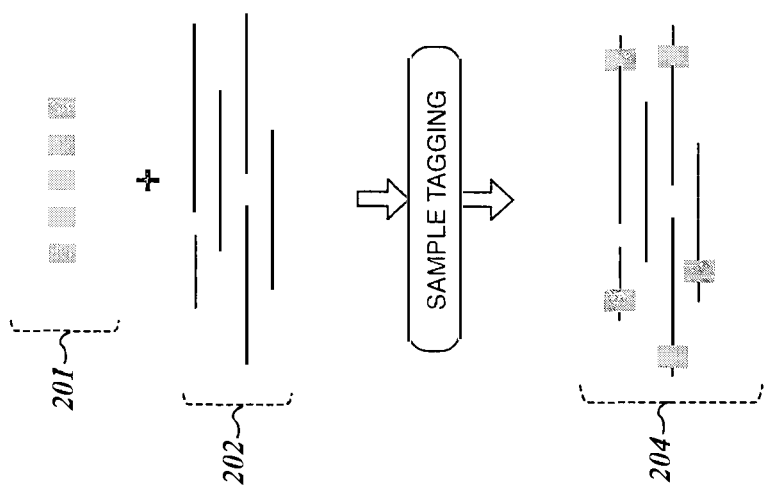
FIG. 2 illustrates an embodiment of the invention whereby a nucleic acid sample is subjected to a sample-tagging step in which one or more nucleic acids of the sample are labeled with an identifiable sequence tag.

FIG. 2 shows a representative embodiment of the sample-tagging step 100 shown in FIG. 1. Specifically, a schematic illustration is shown whereby a plurality of nucleic acid molecules 202 is tagged with a fixed number of sample tags 201. The template DNA 202 can variously consist of a linear or circular DNA template, for example a cDNA, amplicon or plasmid, or a longer DNA template such as genomic DNA, mitochondrial DNA, a bacterial artificial chromosome (BAC), or any arbitrary DNA molecule(s) of interest. The sample-tagging step can comprise, in different embodiments, any of a set of processes known in the art whereby nucleic acid sample or samples are modified or processed to incorporate, a specified polynucleotide tag sequence; the polynucleotide tag sequence itself can comprise one or more adapter regions, primer binding sites, or identifiable sequence tags, also commonly called a DNA barcodes.

Still referring to FIG. 2, in some embodiments, the tag 204 incorporated during the sample tagging step can consist of the same known oligonucleotide sequence, or a different oligonucleotide sequence. Furthermore, the tag 204 could consist of an oligonucleotide sequence of the same or different lengths, where said lengths could range from 4 to 10 bp, or from 8 to 15 bp, or from 10 to 20 bp.

Figure 3:
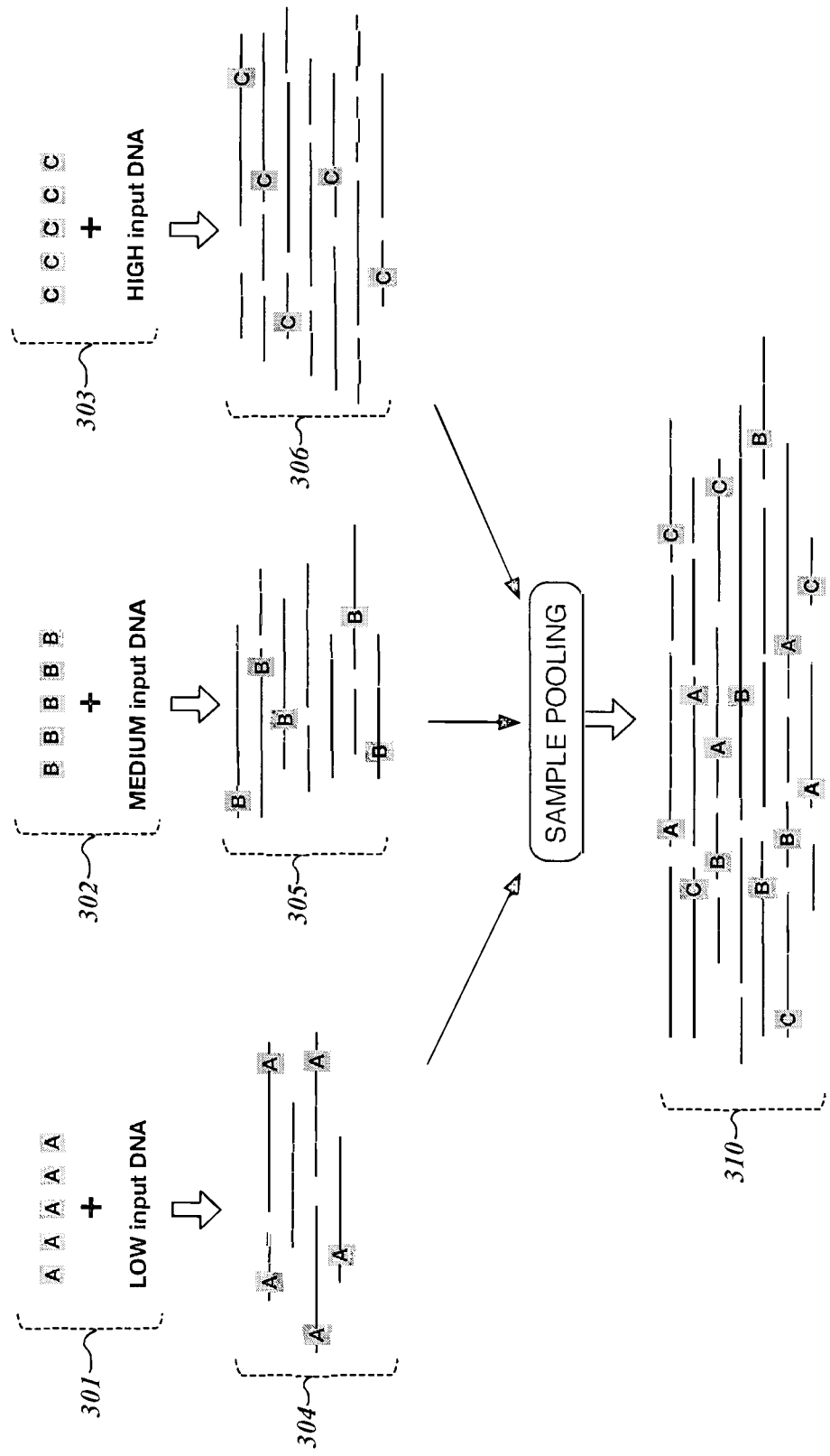
FIG. 3 illustrates the normalizing aspect of the sample-tagging step, whereby a relatively fixed amount of a tagging reagent is used to add identifiable sequence tags to a varying amount of DNA. The tagged products from a plurality of samples are then combined (pooled).

Referring now to FIG. 3, to emphasize the normalizing aspect of the present invention, there is shown a more detailed view of the process whereby samples having different original concentrations are sample-tagged and pooled. Specifically, there are shown three instances of a sample-tagging reaction (301, 302, 303) in which the depicted amount of nucleic acid (DNA) present in each sample varies from low (e.g. 1 ng/µL), to medium (e.g., 10 ng/µL), to high (100 ng/µL). For each of the three sample tagging reaction instances, a relatively fixed and limited sample-tagging condition is used such that the number of tags per prescribed unit mass of nucleic acid is limited. The resulting sample-tagged samples 304, 305 and 306 thereby have a similar number of sample-tagging instances, but still a varying amount of nucleic acid molecules. The plurality of tagged DNA samples is pooled to create a sample pool 310 in which a multiplicity of potentially differently tagged DNA samples produced by processes such as those of FIG. 2 are combined into one heterogeneous mixture. The important feature of this pool is that while it is comprised of different masses of nucleic acid molecules from each sample in rough proportion to the mass of nucleic acid molecules in each sample, the number of sample tagging instances from each sample present in the pool is fixed and normalized. The process of FIG. 3 is an embodiment of the sample pooling step 102 of FIG. 1.

Figure 4:
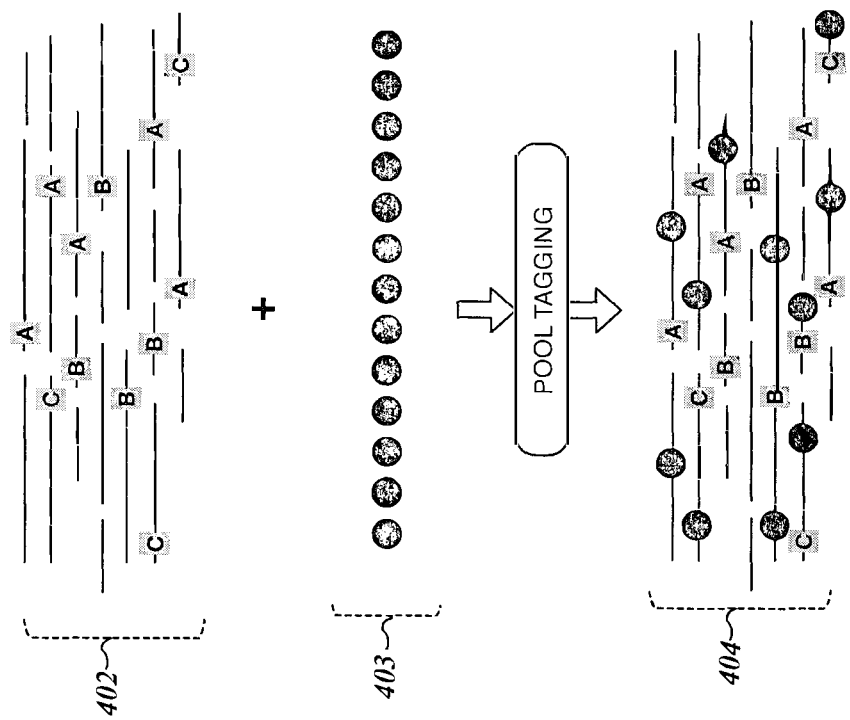
FIG. 4 illustrates a pool tagging step; pooled, sample-tagged nucleic acids are treated to acquire a sequence tag that identifies the sample-tagged nucleic acids as members of that pool.

Referring now to FIG. 4, there is shown an embodiment of the process whereby a plurality of sample-tagged nucleic acid molecules arising from different samples and pooled to create a sample-tagged pool 402 is subjected to pooled tagging (with tags 403) by a pool tagging step to derive a plurality of nucleic acid molecules (404) that variously different instances of either a sample tag, a pool tag, or both. Because the pool tagging step is performed on the aggregated sample-tagged samples, the distribution of pool tags is uniform and the probability that a pool tag site is created within a prescribed distance of a sample tag site is equivalent for all different sample tags in the pool.

In various embodiment, the pool tagging as depicted in FIG. 3. and FIG. 4 can be performed in a manner that tends toward the creation of larger or smaller fragments, for example by titrating the amount of a fragmenting enzyme that is used to produce said fragments. Said fragmenting enzyme could include, for example, DNA Exonuclease I, or Sau3AI endonuclease, or dsDNA Fragmentase®, or a modified DNA transposase such as the Nextera® enzyme. By said methods it is potentially advantageous for different sequencing applications to be able to specify by altering the prescribed methods of the invention, or any related kits, so as to create larger or shorted linear dsDNA fragments.

Figure 5:
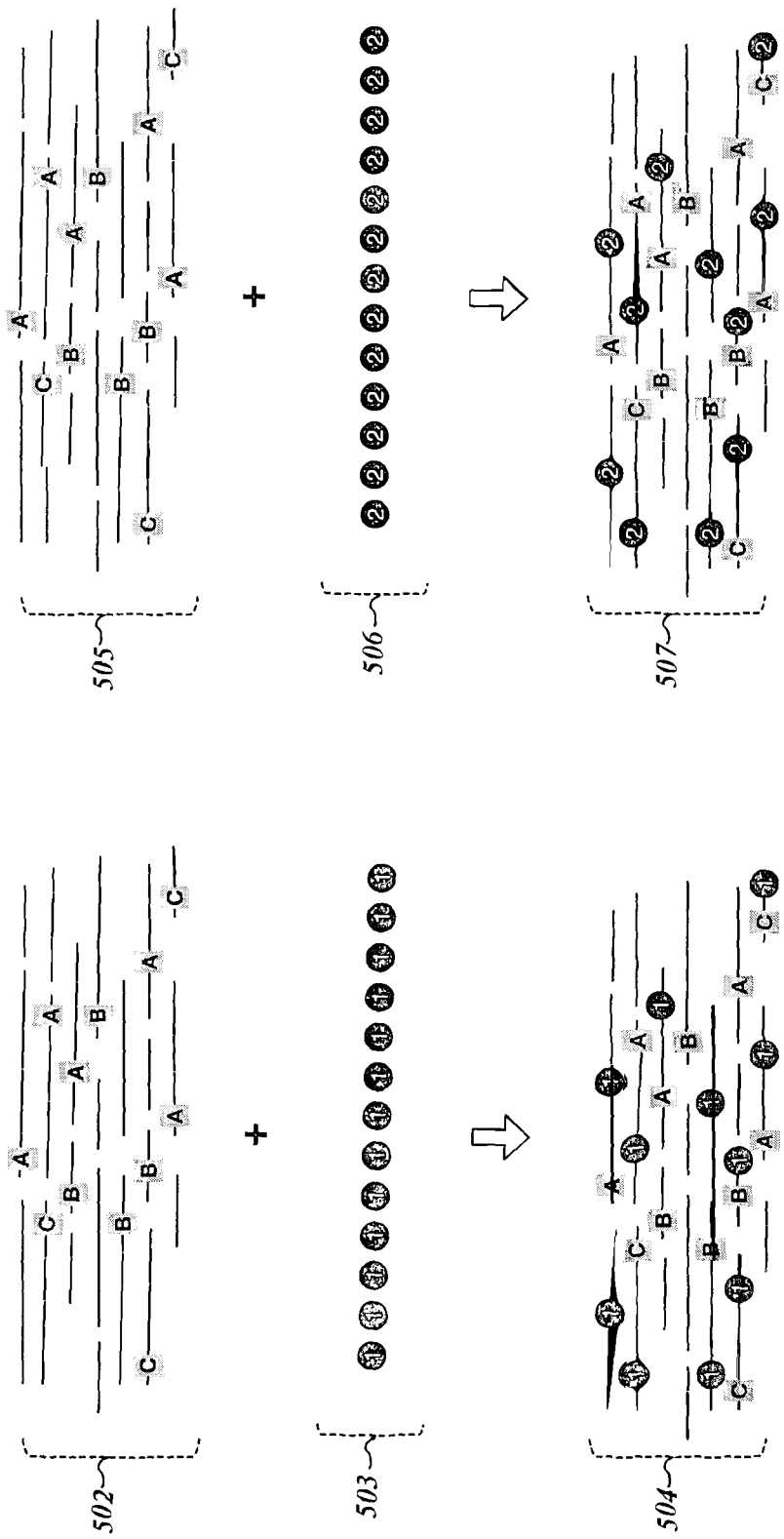
FIG. 5 illustrates multiple distinct pools of sample-tagged nucleic acid molecules being subjected to a pool tagging step with distinct and identifiable pool tags.

Now referring to FIG. 5, there is shown a process whereby a library of fragments generated by the process depicted in FIG. 4 can be amplified and enriched for fragments retaining both the sample tag sequence on one end combined with a portion of potentially unknown sequence on the other end flanked by the shotgun adapter.

Referring now to FIG. 5 there is shown a representative embodiment whereby multiple different pools of sample-tagged nucleic acid molecules (502 and 505) can be treated with different pool tags (503 and 506) so as to obtain a larger number of possible configurations of sample and pool tags combinations (504 and 507) allowing for the sequencing of more samples in parallel.

Figure 6:
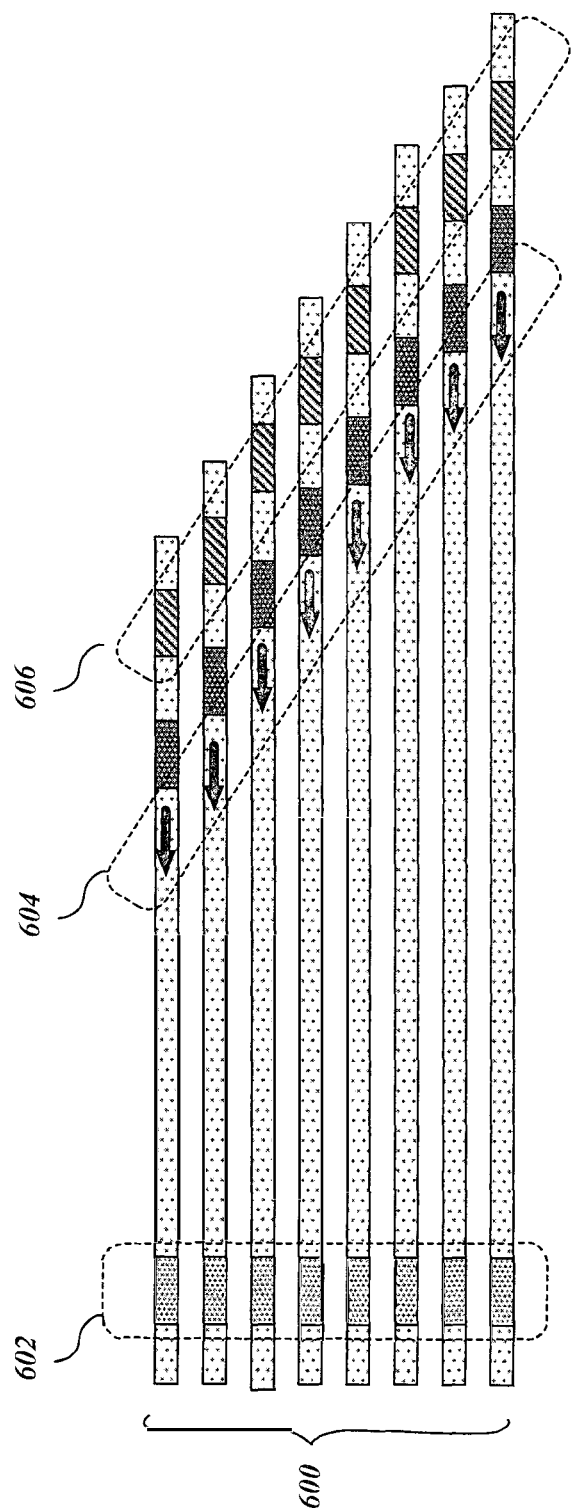
FIG. 6 illustrates a library of fragments being sequenced in parallel to obtain short read information from each of a large plurality of fragments in the library. For each of these fragments, a set of short reads is produced comprising one or more sample tags, one or more collection tags, and one or more other regions of interest on each molecule.

Referring now to FIG. 6, there is shown a depiction of the sequencing of a plurality of library fragments 600 derived from steps shown in FIG. 5, where each library fragment consists of a sample tag 602 and one or more pool tags 606, and an unknown insert region 604. Obtaining the sequence information from both the sample tags and pool tags allows the sequence of the unknown insert region to be associated and/or assigned to a sample in an original plate or collection.

What follows here are certain embodiments of methods of invention, demonstrating by example the application of the method to particular DNA sequencing tasks.

EXAMPLES

Example 1

This example demonstrates the application of methods in the present invention to a collection of genomic DNA (gDNA) samples from strains of *Burkholderia* bacteria contained in a 96-well plate. The following experiment was performed to produce high quality gDNA sequence for each *Burkholderia* isolate. Sample-tagging of each gDNA sample was performed using a modified tagmentation reaction set-up, as described below:

| | |
|---|---|
| 2 μL | 5x Tagmentation buffer (50 mM Tris-HCl; 25 mM MgCl$_2$; 50% Dimethyl Formamide) |
| 0.02 μL | Tagment DNA enzyme (ILLUMINA ® Nextera ®) |
| 5 μL | Q5 ® Hot Start DNA Polymerase Master Mix (NEW ENGLAND BIOLABS ®) |
| 0.5 μL | 10 μM Sample-tagging Forward Primer (e.g., SEQ ID NO: 1) in 10 mM Tris-HCl |
| 0.5 μL | 10 μM Universal Reverse Primer (e.g., SEQ ID NO: 2) in 10 mM Tris-HCl |
| 2 μL | gDNA sample (average conc. 2.5 ng/μL) |

SEQ ID NO: 1
5'-AGACGTGTGCTCTTCCGATCTCAACCCGAACCGAGTCTCGTGGGCT

CGGAGATGTGTATAAGAGACAG-3'

SEQ ID NO: 2
5'-TCGTCGGCAGCGTCAGATGTGTATAAGAGACAG-3'

All 96 reactions received/were carried out with the same Universal Reverse Primer (SEQ ID NO:2) and each reaction also received/was carried out with a distinct sample-tagging forward primer (i.e., one of 96 unique sample-tagging primers, an example of which is shown in SEQ ID NO:1). Tagmentation and sample-tagging by PCR were conducted in the same reaction using a thermal cycler programmed as follows:

| | |
|---|---|
| 1. | 55° C. for 5 minutes |
| 2. | 72° C. for 3 minutes |
| 3. | 98° C. for 15 seconds |
| 4. | 58° C. for 30 seconds |
| 5. | 72° C. for 1 minute |
| 6. | Return to Step 3, 9 additional times |
| 7. | 72° for 3 minutes |
| 8. | Hold at 4° C. |

Upon completion of the PCR, 10 μL of the sample-tagged PCR products (samples labeled with identifiable sequencing tags) from each well of the 96-well PCR plate were pooled into a single 1.5 mL microcentrifuge tube (EPPENDORF® DNA LoBind), and then purified using 0.7× volume of Agencourt® AMPure® XP magnetic beads (BECKMAN COULTER GENOMICS®) according to the manufacturer's instructions.

The pooled, purified products were quantified using fluorometric quantitation with the PicoGreen dsDNA Assay Kit (INVITROGEN®) and readings obtained on a TECAN® Infinite M200 Microplate Reader. The quantified pooled, sample-tagged product was then adjusted to a concentration of 0.8 ng/μL with 10 mM Tris-HCl, pH 8.0, and subjected to a second round of tagmentation using the following reaction setup conditions:

| | |
|---|---|
| 2 μL | 5X Tagmentation buffer (50 mM Tris-HCl; 25 mM MgCl$_2$; 50% Dimethyl Formamide) |
| 2.8 μL | Sterile distilled water |
| 5 μL | Purified sample-tagged product (0.8 ng/μL) |
| 0.2 μL | Tagment DNA enzyme (ILLUMINA ® Nextera ®) |

Reactions were assembled in 0.2 mL wells of 8-well PCR strip tubes, and sealed with plastic caps. The tagmentation reactions were incubated at 55° C. for 10 minutes, then held at 4° C., using a BIO-RAD® iCycler DNA thermal cycler.

After the second tagmentation, the products were PCR-amplified using pool-tagging primers, using the reaction conditions below:

| | |
|---|---|
| 10 μL | Tagmentation reaction (from above) |
| 11 μL | Q5 ® Hot Start DNA Polymerase Master Mix (NEW ENGLAND BIOLABS ®) |
| 1 μL | 10 μM Pool-tagging Forward Primer (e.g., SEQ ID NO: 3) in 10 mM Tris-HCl |
| 1 μL | 10 μM Pool-tagging Reverse Primer (e.g., SEQ ID NO: 4) in 10 mM Tris-HCl |

SEQ ID NO: 3:
5'-CAAGCAGAAGACGGCATACGAGATTCGCCTTAGTGACTGGAGTTCA

GA CGTGTGCTCTTCCGATC-3'

SEQ ID NO: 4:
5'-AATGATACGGCGACCACCGAGATCTACACTAGATCGCTCGTCGGCA

GC GTCAGATGTGTATAAGAGACAG-3'

For each PCR reaction, we used a different combination of Pool-tagged Forward Primer and Index Reverse Primer. The PCR reactions were assembled in the same 8-well PCR strip tubes used previously for tagmentation steps, and then cycled as follows:

| | |
|---|---|
| 1. | 98° C. for 4 minutes |
| 2. | 95° C. for 15 seconds |
| 3. | 55° C. for 30 seconds |
| 4. | 72° C. for 2 minutes |
| 5. | Return to Step 2, 9 additional times |
| 6. | 72° for 3 minutes |
| 7. | hold at 4° C. |

After amplification, the samples were then mixed and pooled into one 1.5 mL microcentrifuge tube to create a pool. From the pool mixture, 100 μL was purified and size-selected with 60 μL of Agencourt® AMPure® XP magnetic beads using the manufacturer's recommended binding and washing protocols.

The purified, size-selected collection pool was then diluted 10,000-fold and assayed by qPCR using a KAPA®

ILLUMINA® Library Quantification kit. The quantified library was then sequenced for a total of 164 sequencing cycles using an ILLUMINA® MiSeq® sequencing system (150 cycle v3 chemistry) with the following read length configuration:

| Read 1 | 135 cycles |
| Index 1 | 8 cycles |
| Index 2 | 8 cycles |
| Read 2 | 13 cycles |

Demultiplexing of reads: Using customized processing scripts, sequencing data obtained from the MiSeq® sequencer was analyzed to obtain the collection and sample tags for each of the approximately 1 million reads that resulted from sequencing of the library. A FASTQ file was generated from each of the 96 samples that were processed using this demultiplexing process.

Figure 7:
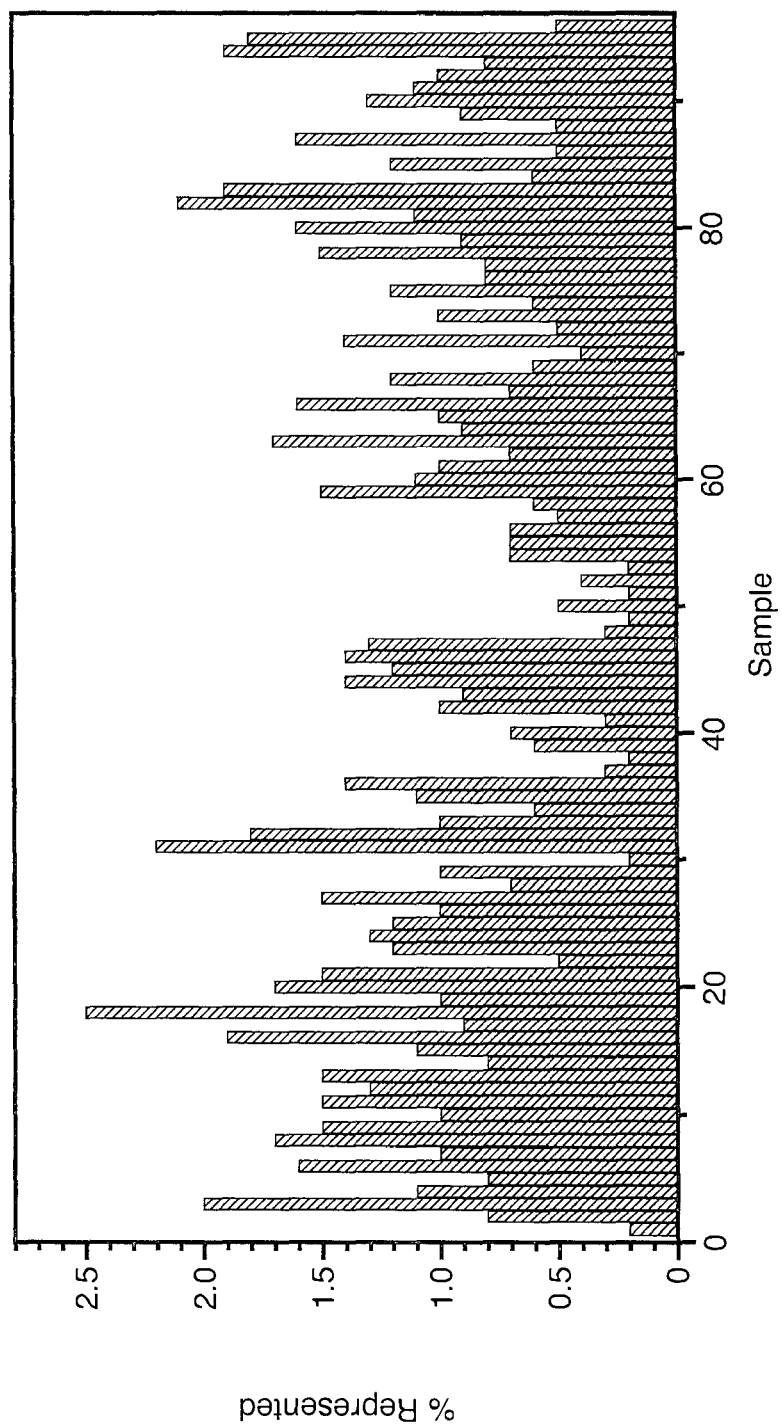
FIG. 7 is a graph showing an example of coverage obtained after sequencing a library generated using a method of the present invention (see the study described in Example 1). The "samples of a plurality" were 96 samples within a 96-well plate of genomic DNAs harvested from isolates of *Burkolderia* bacteria.

Evaluation of % of wells producing sequence: FIG. 7 shows the relative fraction of reads (% of total) derived from the sequencing data that are assignable to each of the 96 *Burkholderia* samples on the original plate that was processed using the described methods.

Example 2

This example demonstrates the use of the present methods to derive long assembled reads from a collection of plasmid clones derived from a *Xenopus* open reading-frame (ORF) collection. Ten (10) 96-well plates of plasmid clones were treated as follows.

Sample shotgun adaptation was performed using these reaction set-up conditions:

| | |
|---|---|
| 2 μL | 5X Tagmentation buffer (50 mM Tris-HCl; 25 mM $MgCl_2$; 50% Dimethyl Formamide) |
| 0.02 μL | Tagment DNA enzyme (ILLUMINA ® Nextera ®) |
| 5 μL | Q5 ® Hot Start DNA Polymerase Master Mix (NEW ENGLAND BIOLABS ®) |
| 0.5 μL | Sample-tagged Forward Primer (e.g. SEQ ID NO: 1) (10 μM in 10 mM Tris-HCl) |
| 0.5 μL | Universal Reverse Primer (SEQ ID NO: 2) (10 μM in 10 mM Tris-HCl) |
| 2 μL | Template DNA (2.5 ng/μL) |

Reactions were assembled using a different Sample-tagged Forward Primer in each well of a 96-well PCR plate (e.g., SEQ ID NO:1), but the same Universal Reverse Primer was used in all 96 reactions. Reactions were then incubated in a thermal cycler as follows:

| | |
|---|---|
| 1. | 55° C. for 5 minutes |
| 2. | 72° C. for 3 minutes |
| 3. | 98° C. for 15 seconds |
| 4. | 58° C. for 30 seconds |
| 5. | 72° C. for 1 minute |
| 6. | Return to Step 3, 9 additional times |
| 7. | 72° for 3 minutes |
| 8. | hold at 4° C. |

Upon completion of thermal cycling, 10 μL of sample-tagged PCR products from each well of the PCR plate were pooled into a single 1.5 mL microcentrifuge tube (EPPENDORF® DNA LoBind), and purified using 0.7× volume of AMPure® XP beads.

The purified sample-tagged PCR products were quantified using fluorometric quantitation with the PicoGreen dsDNA Assay Kit (INVITROGEN®) and readings obtained on a TECAN® Infinite M200 Microplate Reader. The quantified products were subsequently adjusted to an average concentration of 0.8 ng/μL in Tris-HCl, pH 8.0.

The purified sample-tagged PCR products were then subjected to a second tagmentation using the following reaction setup conditions:

| | |
|---|---|
| 2 μL | 5X Tagmentation buffer (50 mM Tris-HCl; 25 mM $MgCl_2$; 50% Dimethyl Formamide) |
| 2.75 μL | sterile distilled water |
| 5 μL | Purified sample-tagged product (0.8 ng/μL) |
| 0.25 μL | Tagment DNA enzyme (ILLUMINA ® Nextera ®) |

Reactions were assembled in 0.2 mL wells of 8-well PCR strip tubes, and sealed with plastic caps. The tagmentation reactions were incubated at 55° C. for 10 minutes, then held at 4° C., using a BIO-RAD® iCycler DNA thermal cycler.

The products of the second tagmentation reaction were then amplified using pool-tagged primers, using the following PCR reaction setup conditions:

| | |
|---|---|
| 10 μL | Second tagmentation products (from above) |
| 11 μL | KAPA ® HiFi 2X Polymerase Master Mix |
| 1 μL | 10 μM Pool-tagged Forward Primer (e.g. SEQ ID NO: 3) in 10 mM Tris-HCl |
| 1 μL | 10 μM Pool-tagged Index Reverse Primer (e.g., SEQ ID NO: 4) in 10 mM Tris-HCl) |

To create ten (10) pool-tagged sub-libraries from the products of the second tagmentation, each reaction was setup using a pool of 96 sample-tagged DNAs from a different 96-well plate of cloned *Xenopus* ORFs as template, and then each reaction received a unique combination of pool-tagged forward and reverse primers to unambiguously assign sequencing reads with each 96-well plate. These ten (10) PCR reactions were assembled in the same 8-well PCR strip tubes as were used for the second tagmentation step, and after sealing, the reactions were cycled as follows:

| | |
|---|---|
| 1. | 95° C. for 4 minutes |
| 2. | 95° C. for 15 seconds |
| 3. | 56° C. for 30 seconds |
| 4. | 72° C. for 2 minutes |
| 5. | Return to Step 2, 9 additional times |
| 6. | 72° for 3 minutes |
| 7. | hold at 4° C. |

After amplification, the ten (10) reactions, now representing distinct pool-tagged sub-libraries, were pooled into a single 1.5 mL microcentrifuge tube to create a single pool-tagged library (i.e., a pool of pooled samples). From the pool-tagged library, 100 μL was size-selected with 60 μL of AMPure® XP (BECKMAN COULTER GENOMICS®) using the manufacturer's recommended binding and washing protocols, generally enriching for fragments that were 300 bp and greater in size.

The purified, size-selected, pool-tagged library was diluted 10,000-fold and assayed by qPCR using a KAPA® ILLUMINA® Library Quantification kit. The quantified library was then sequenced for a total of 127 sequencing cycles using an ILLUMINA® MiSeq® sequencing system, with the following read length configuration:

| | |
|---|---|
| Read 1 | 100 cycles |
| Index 1 | 8 cycles |
| Index 2 | 8 cycles |
| Read 2 | 13 cycles |

Demultiplexing of reads: Using customized processing scripts, sequencing data obtained from the MiSeq® sequencer was analyzed to obtain the pool tags and sample tags for each of the approximately 1 million reads that resulted from sequencing of the library. A FASTQ file was generated from each of the 96 samples from each of the 10 plates that were processed using this demultiplexing process.

Figure 8:
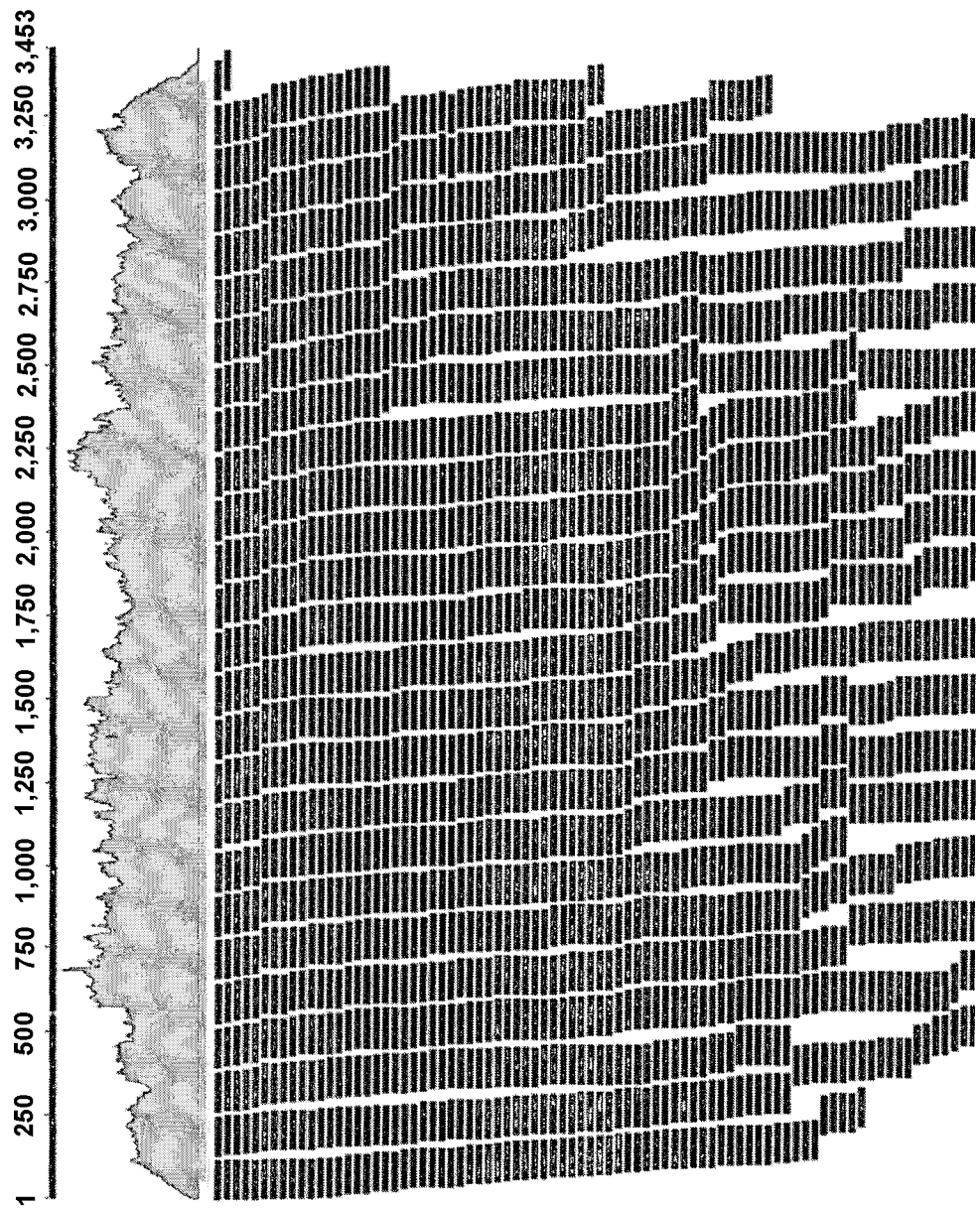
FIG. 8 shows an example of an assembled contiguous nucleotide sequence obtained from a multi-kilobase plasmid template, using a method of the present invention, as illustrated in Example 2.

Assembly of reads: The demultiplexed reads were then subjected to de novo assembly using the software program Geneious®. The output of this analysis is a list of assembled contiguous sequences (contigs) that correspond to the full length sequence of each of the template DNAs in the original collection. FIG. 8 shows an example of a de novo assembly with a length of approximately 3.5 kb deriving from this process.

Example 3

This example demonstrates the normalizing properties of the present invention by comparing the number of DNA sequencing reads generated from 96 DNA standards, all possessing equal DNA mass, to the number of reads generated from a two-fold dilution series of the same standard DNA.

A hyperactive Tn5 Transposase was purified to a stock concentration of 35 µM as described in Picelli et al. (*Genome Research* 15:2033-2040, 2014).

Two 96-well plates of DNA standards (2-log DNA ladder 0.1-10.0 kb, NEW ENGLAND BIOLABS®) were prepared: control plate A (10 ng of DNA standard in all 96 wells) and dilution plate B (a two-fold serial dilution of DNA standard starting with 128 ng of standard input DNA across all 12 wells of row H, and ending with 2 ng of DNA standard across all 12 wells in row B. Each sample from plates A and B were individually labeled with identifiable sequence tags using the following reaction setup conditions:

The following components were added to every well of each 96-well PCR plate to tag each sample separately:

| | |
|---|---|
| 2 µL | 5x Transposase Buffer (50 mM TAPS, pH 8.5; 25 mM MgCl$_2$; 40% PEG 8000) |
| 3 µL | Hyperactive Tn5 Transposase Reagent (100-fold diluted enzyme) loaded with individual identifiable sequence tag oligos (e.g., SEQUENCE ID NO: 5 hybridized to SEQUENCE ID NO: 6 |
| 5 µL | DNA standard in 10 mM Tris-HCl, pH 8.0 |

SEQUENCE ID NO: 5:
5'-CAAGCAGAAGACGGCATACGAGATACTAACTGGTCTCGTGGGCTCG

GAGATGTGTATAAGAGACAG-3'

SEQUENCE ID NO: 6:
5'-Phosphate-CTGTCTCTTATACACATCT-3'

After sealing the plates with adhesive foil, the sequence tags were added directly to samples via tagmentation. The reactions were incubated as follows: 55° C. for 15 minutes, 72° C. for 5 minutes, and then held at 4° C. using a BIO-RAD® Tetrad DNA thermal cycler.

Next, 2 µL of 60 unit/mL proteinase K solution (NEBIO-LABS®), and 3 µL of STOP solution (167 mM MgCl$_2$; 6.7% SDS) were added per well. The 96-well PCR plate was resealed with adhesive foil; incubated in the thermal cycler at 50° C. for 15 minutes; and then at 68° C. for 5 minutes.

After completion of the proteinase K reactions, all the sample tagged products from plate A (DNA control) were pooled in a single microcentrifuge tube; and all the sample-tagged products from plate B (DNA dilution series) were pooled in a separate microcentrifuge tube. The pooled sample-tagged products from plate A and from plate B were then purified separately as follows: an equal volume of MAGwise™ Paramagnetic Purification Beads (SEQWELL™) was added to each sample and bound for 5 minutes before magnetic separation; next, the beads were washed two times with 80% ethanol, and then resuspended in 10 mM Tris-HCl, pH 8.0 to elute the purified DNA in accordance with the operating instructions. Finally, after incubating for 5 minutes to magnetically remove the beads from suspension, about 30 µL of each eluted DNA was transferred to a clean 1.5 mL microcentrifuge tube (EPPENDORF® DNA LoBind).

After purifying the two sample-tagged products, the entire volume of each eluate (30 µL) was transferred to separate wells in an 8-well PCR strip tube, and the following components were added to set-up the second tagmentation:

| | |
|---|---|
| 9 µL | 5x Transposase Buffer (50 mM TAPS, pH 8.5; 25 mM MgCl$_2$; 40% PEG 8000) |
| 5 µL | Hyperactive Tn5 Transposase Enzyme (1.5-fold pre-diluted enzyme) loaded with identifiable pool tags (SEQUENCE ID NO: 7 and SEQUENCE ID NO: 8) |

SEQ ID NO: 7:
5'-AATGATACGGCGACCACCGAGATCTACACTAGATCGCTCGTCGGCA

GCGTCAGATGTGTATAAGAGACAG-3'

SEQ ID NO: 8:
5-Phosphate-CTGTCTCTTATACACATCT-3

After sealing the 8-well PCR strip tube with adhesive foil, the pool-tagging reactions were incubated in the thermal cycler as follows:

| | |
|---|---|
| 1. | 55° C. for 15 minutes |
| 2. | 72° C. for 5 minutes |
| 3. | hold at 4° C. |

Then 12 µL of STOP solution was added to each pool-tagging reaction. After resealing, the 8-well PCR strip was returned to the thermal cycler, and incubated as follows:

| | |
|---|---|
| 1. | 50° C. for 15 minutes |
| 2. | 68° C. for 5 minutes |
| 3. | Hold at 25° C. |

An equal volume of MAGwise™ Paramagnetic Purification Beads (SEQWELL™) was added to each sample, and incubated for 5 minutes before magnetic separation. Next, the beads were washed two times with 80% ethanol, and then were resuspended in 10 mM Tris-HCl to elute the purified DNA in accordance with the operating instructions. Finally, after incubating for 5 minutes to magnetically remove the beads from suspension, about 30 μL of each eluted DNA was transferred to a clean 1.5 mL microcentrifuge tubes (EPPENDORF® DNA LoBind).

Two adapter fill-in reactions were set-up as described below to extend the recessed 3'-overhangs remaining on DNA fragments after tagmentation. Fill-in reactions were assembled in 8-well PCR strip tubes.

| | |
|---|---|
| 25 μL | Purified DNA (labeled with identifiable sample- and pool-sequence tags |
| 23.5 μL | 2X KAPA ® HiFi Polymerase Master Mix |
| 1.5 μL | Vent ® DNA Polymerase (NEBIOLABS ®) |

After sealing the 8-well PCR strip tube, the fill-in reactions were incubated in the thermal cycler at 72° C. for 10 minutes. Then immediately following the adapter fill-in, the following primers were added directly to the reactions to initiate library amplification using the PCR:

| | |
|---|---|
| 2 μL | 10 μM P5 primer (SEQ ID NO: 9) |
| 2 μL | 10 μM P7 primer (SEQ ID NO: 10) |

SEQ ID NO: 9:
5'-AATGATACGGCGACCACCGA-3'

SEQ ID NO: 10:
5'-CAAGCAGAAGACGGCATACGA-3'

The 8-well PCR strip tube was resealed, then returned to the thermal cycler for library amplification using the following PCR cycling conditions:

| | |
|---|---|
| 1. | 95° C. for 3 minutes |
| 2. | 95° C. for 30 seconds |
| 3. | 62° C. for 45 seconds |
| 4. | 72° C. for 3 minutes |
| 5. | Return to Step 2, 14 additional times |
| 6. | hold at 4° C. |

After PCR amplification, the two libraries (corresponding to samples from control and dilution series) were each mixed with 0.75× volumes of MAGwise™ Paramagnetic Purification Beads (SEQWELL™) to size-select each library, and incubated for 5 minutes before magnetic separation. Next, the beads were washed two times with 80% ethanol, and then resuspended in 10 mM Tris-HCl to elute the purified DNA in accordance with the manufacturer's operating instructions. Finally, after incubating for 5 minutes to magnetically remove the beads from suspension, about 30 μL of each purified library was transferred to two clean 1.5 mL microcentrifuge tubes (EPPENDORF® DNA LoBind). An aliquot of each size-selected library was analyzed by gel electrophoresis, and upon inspection the fragment length distribution appeared to be approximately 300 bp and greater in length.

The purified, size-selected library was then diluted 10,000-fold and assayed by qPCR using a KAPA® ILLUMINA® Library Quantification kit. The quantified library was then sequenced for a total of 318 cycles using an ILLUMINA® NextSeq® 500 sequencing system, with a high output flow cell configuration and using the following read length configuration:

| | |
|---|---|
| Read 1 | 151 cycles |
| Index 1 | 8 cycles |
| Index 2 | 8 cycles |
| Read 2 | 151 cycles |

Demultiplexing of reads: Using customized processing scripts, sequencing data obtained from the NextSeq® 500 sequencer was analyzed to obtain the sample-specific and plate-specific identifiable sequence tags for each of the samples in approximately 500 million reads that resulted from sequencing each library. FASTQ files were also generated for 96 samples on each of the 2 plates that were processed using this demultiplexing process.

Figure 9:
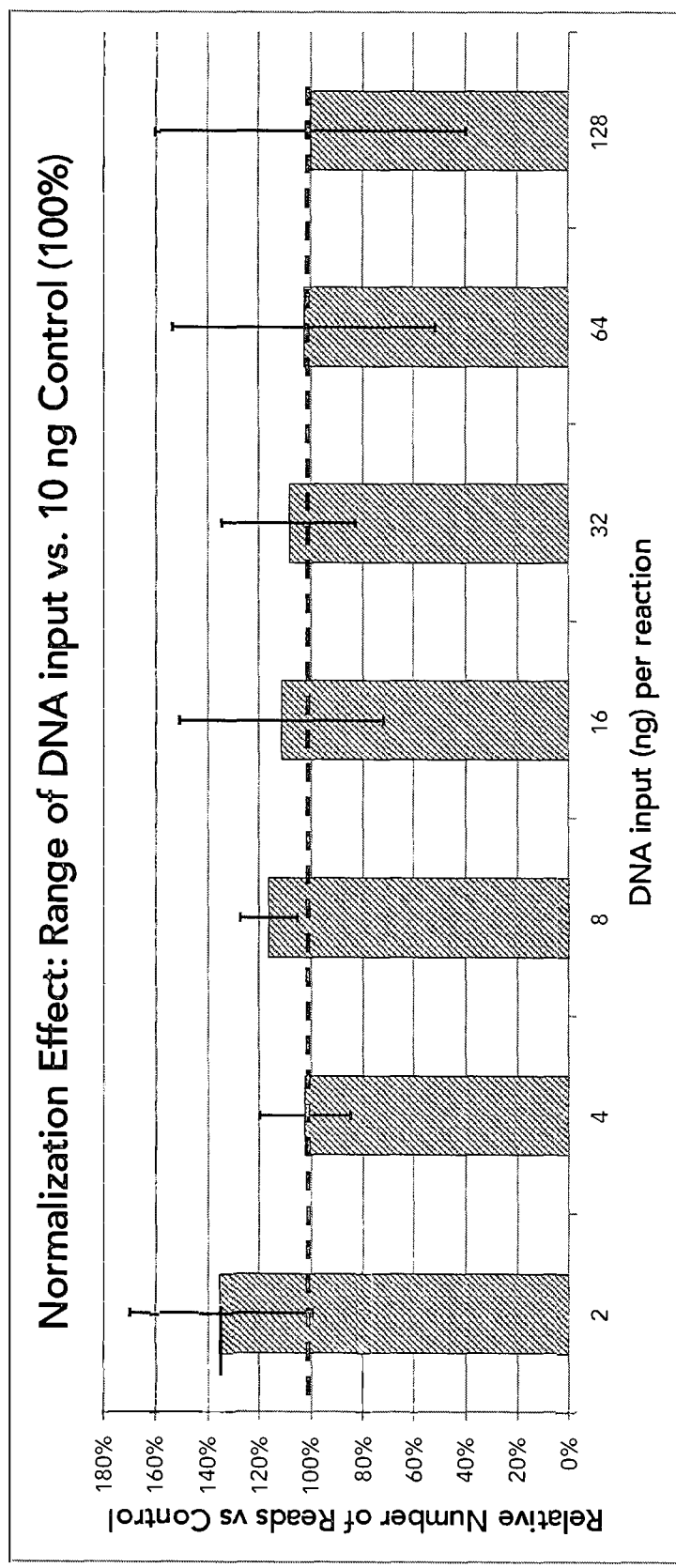
FIG. 9 is a graph showing an example of the normalization performance of a method of the invention, ascertained by sequencing a plurality of samples having different original input nucleic acid concentrations. The normalization effect achieved by the methods of the invention may be the same as (or about the same as) the effects reported here.

Assessing Normalization Results: The number of demultiplexed sequencing reads from each of the diluted DNA samples was compared to the average number of reads generated from a fixed amount of control DNA (set at 100%). The output of this analysis is shown in FIG. 9. Average read numbers fell within a narrow 1.4-fold range over a range of DNA input masses of greater than 60-fold (2 ng to 128 ng of DNA input). The results in Example 3 highlight the substantial normalizing effect that can be achieved using the present methods.

What is claimed is:

1. A method of normalizing DNA, the method comprising:
   (a) contacting target DNA molecules in a first source with a uniform and limiting amount of a first construct comprising a transposase or a biologically active variant thereof and contacting target DNA molecules in a second source with a uniform and limiting amount of a second construct comprising a transposase or a biologically active variant thereof, wherein the first and second constructs each comprise a distinguishable source oligonucleotide tag, wherein the source oligonucleotide tag in the first construct differs from the source oligonucleotide tag in the second construct and the contacting occurs for a duration and under conditions in which the source oligonucleotide tag in the first construct is integrated into the DNA molecules in the first source via tagmentation and the source oligonucleotide tag in the second construct is integrated into the DNA molecules in the second source via tagmentation;
   (b) combining the first and second sources to yield a first mixture; and (c) contacting the DNA molecules of the first mixture with a third construct comprising a mixture oligonucleotide tag for a duration and under conditions in which the mixture oligonucleotide tag is integrated into the DNA molecules of the first mixture via tagmentation at a defined frequency per nucleotide, thereby normalizing DNA molecules with source and mixture oligonucleotide tags from the first and second sources, wherein the third construct further comprises a transposase or a biologically active variant thereof, and wherein the defined frequency results in the integration of a mixture oligonucleotide tag at an average distance away from each source oligonucleotide tag on the DNA molecules of the first mixture, wherein the average distance is between about 100-20,000 nucleotides, wherein the number of first constructs used to contact the target DNA molecules in the first source is approximately equal to the number of second constructs used to contact the target DNA molecules in the second source, and wherein the number of the source oligonucleotide tags of the first construct integrated into the DNA molecules of the first source is approximately equal to the number of the source oligonucleotide tags of the second construct integrated into the nucleic acid molecules of the second sample, regardless of the amount of nucleic acid present in the first sample and the second sample.

2. The method of claim 1, wherein the mixture oligonucleotide tag comprises a distinguishable mixture oligonucleotide tag sequence.

3. The method of claim 1, wherein at least one target DNA molecule in the first source comprises genomic DNA or at least one target DNA molecule in the second source comprises genomic DNA.

4. The method of claim 1, wherein at least one target DNA molecule in the first source comprises cDNA, synthetic DNA, or DNA found naturally in a virus, bacterium, yeast, fungus, protozoan, insect, fish, avian, mammal, or plant or at least one target DNA molecule in the second source comprises cDNA, synthetic DNA, or DNA found naturally in a virus, bacterium, yeast, fungus, protozoan, insect, fish, avian, mammal, or plant.

5. The method of claim 1, wherein the method further comprises contacting target DNA molecules in 1-9,598 additional sources with the first construct or the second construct.

6. The method of claim 1, wherein, in the conditions in which the distinguishable source oligonucleotide tag is inserted into the target DNA molecules, the amount(s) of the distinguishable source oligonucleotide tag(s) is/are at least two-fold lower than the amount(s) of the mixture oligonucleotide tag(s) subsequently used to contact the DNA molecules of the first mixture.

7. The method of claim 1, wherein the first, second, or third construct, independently, comprises a moiety that specifically binds a capture agent.

8. The method of claim 7, wherein the moiety that specifically binds a capture agent is a nucleic acid sequence that specifically binds a protein or nucleic acid sequence within the capture agent.

9. The method of claim 7, wherein the moiety that specifically binds a capture agent is a moiety that has been biotinylated or digoxigenylated.

10. The method of claim 7, further comprising the step of exposing the DNA molecules of the first mixture to a limited amount of the capture agent.

11. The method of claim 1, further comprising sequencing the normalized DNA molecules using next generation sequencing.

12. The method of claim 1, wherein the first construct does not insert into all of the DNA molecules in the first source.

* * * * *

SEQUENCE LISTING

```
Sequence total quantity: 10
SEQ ID NO: 1            moltype = DNA  length = 68
FEATURE                 Location/Qualifiers
source                  1..68
                        mol_type = other DNA
                        organism = synthetic construct
SEQUENCE: 1
agacgtgtgc tcttccgatc tcaacccgaa ccgagtctcg tgggctcgga gatgtgtata   60
agagacag                                                            68

SEQ ID NO: 2            moltype = DNA  length = 33
FEATURE                 Location/Qualifiers
source                  1..33
                        mol_type = other DNA
                        organism = synthetic construct
SEQUENCE: 2
tcgtcggcag cgtcagatgt gtataagaga cag                                33

SEQ ID NO: 3            moltype = DNA  length = 65
FEATURE                 Location/Qualifiers
```

```
source                  1..65
                        mol_type = other DNA
                        organism = synthetic construct
SEQUENCE: 3
caagcagaag acggcatacg agattcgcct tagtgactgg agttcagacg tgtgctcttc   60
cgatc                                                               65

SEQ ID NO: 4            moltype = DNA  length = 70
FEATURE                 Location/Qualifiers
source                  1..70
                        mol_type = other DNA
                        organism = synthetic construct
SEQUENCE: 4
aatgatacgg cgaccaccga gatctacact agatcgctcg tcggcagcgt cagatgtgta   60
taagagacag                                                          70

SEQ ID NO: 5            moltype = DNA  length = 66
FEATURE                 Location/Qualifiers
source                  1..66
                        mol_type = other DNA
                        organism = synthetic construct
SEQUENCE: 5
caagcagaag acggcatacg agatactaac tggtctcgtg ggctcggaga tgtgtataag   60
agacag                                                              66

SEQ ID NO: 6            moltype = DNA  length = 19
FEATURE                 Location/Qualifiers
source                  1..19
                        mol_type = other DNA
                        organism = synthetic construct
SEQUENCE: 6
ctgtctctta tacacatct                                                19

SEQ ID NO: 7            moltype = DNA  length = 70
FEATURE                 Location/Qualifiers
source                  1..70
                        mol_type = other DNA
                        organism = synthetic construct
SEQUENCE: 7
aatgatacgg cgaccaccga gatctacact agatcgctcg tcggcagcgt cagatgtgta   60
taagagacag                                                          70

SEQ ID NO: 8            moltype = DNA  length = 19
FEATURE                 Location/Qualifiers
source                  1..19
                        mol_type = other DNA
                        organism = synthetic construct
SEQUENCE: 8
ctgtctctta tacacatct                                                19

SEQ ID NO: 9            moltype = DNA  length = 20
FEATURE                 Location/Qualifiers
source                  1..20
                        mol_type = other DNA
                        organism = synthetic construct
SEQUENCE: 9
aatgatacgg cgaccaccga                                               20

SEQ ID NO: 10           moltype = DNA  length = 21
FEATURE                 Location/Qualifiers
source                  1..21
                        mol_type = other DNA
                        organism = synthetic construct
SEQUENCE: 10
caagcagaag acggcatacg a                                             21
```